(12) United States Patent
Nishimura et al.

(10) Patent No.: US 8,274,481 B2
(45) Date of Patent: Sep. 25, 2012

(54) DISPLAY DEVICE WITH TOUCH SENSOR, AND DRIVE METHOD FOR THE DEVICE

(75) Inventors: Tomohiko Nishimura, Soraku-gun (JP);
Saburoh Miyamoto, Kizugawa (JP);
Toshihisa Nakano, Tenri (JP); Hiroshi Hamada, Nara (JP); Takeshi Yamaguchi, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 884 days.

(21) Appl. No.: 11/665,999

(22) PCT Filed: Oct. 21, 2005

(86) PCT No.: PCT/JP2005/019391
§ 371 (c)(1),
(2), (4) Date: Apr. 23, 2007

(87) PCT Pub. No.: WO2006/043660
PCT Pub. Date: Apr. 27, 2006

(65) Prior Publication Data
US 2007/0262966 A1 Nov. 15, 2007

(30) Foreign Application Priority Data

Oct. 22, 2004 (JP) .................................. 2004-308533
Oct. 22, 2004 (JP) .................................. 2004-308534

(51) Int. Cl.
*G06F 3/041* (2006.01)
(52) U.S. Cl. ........................................................ 345/173
(58) Field of Classification Search ........... 345/173–174
See application file for complete search history.

(56) References Cited

U.S. PATENT DOCUMENTS

| 5,327,163 | A   |   | 7/1994 | Hashimoto et al. |
| 5,543,590 | A   | * | 8/1996 | Gillespie et al. ............ 178/18.06 |
| 6,556,935 | B2  |   | 4/2003 | Morimura et al. |

(Continued)

FOREIGN PATENT DOCUMENTS

EP      0 589 498 A1     3/1994

(Continued)

OTHER PUBLICATIONS

International Search Report for PCT/JP2005/019391 mailed Jan. 24, 2006.

(Continued)

*Primary Examiner* — Alexander Eisen
*Assistant Examiner* — Christopher E Leiby
(74) *Attorney, Agent, or Firm* — Nixon & Vanderhye P.C.

(57) ABSTRACT

A touch-sensored display device 20 according to the present invention includes: a counter substrate 6 disposed on a viewer side of an active matrix substrate 8 via a display medium layer 4, the counter substrate 6 having a counter electrode 5 which opposes pixel electrodes; a display panel driving circuit 14 for supplying to the counter electrode 5 a common voltage which undergoes periodic inversion in polarity; a transparent conductive film 7 for position detection placed so as to oppose the counter electrode 5 via the counter substrate 6; a strobe signal generation circuit 32 for generating a strobe signal which is in synchronization with a polarity inversion period of the common voltage, and a noise-cut current signal generation circuit 30 for generating a noise-cut current signal which is obtained by eliminating based on the strobe signal a predetermined portion from a current flowing from a terminal connected to the transparent conductive film 7 for position detection.

28 Claims, 8 Drawing Sheets

U.S. PATENT DOCUMENTS 6,621,487 B2 9/2003 Iwasaki et al.
2004/0217945 A1* 11/2004 Miyamoto et al. ............ 345/173

FOREIGN PATENT DOCUMENTS

| | | |
|---|---|---|
| JP | 58-205287 | 11/1983 |
| JP | 62-37725 | 2/1987 |
| JP | 62-165229 | 7/1987 |
| JP | 63-268027 | 11/1988 |
| JP | 10-319367 A | 12/1988 |
| JP | 4-371916 | 12/1992 |
| JP | 5-35400 | 2/1993 |
| JP | 5-150902 A | 6/1993 |
| JP | 6-187082 | 7/1994 |
| JP | 6-318137 A | 11/1994 |
| JP | 7-219709 | 8/1995 |
| JP | 8-152969 A | 6/1996 |
| JP | 9-128146 | 5/1997 |
| JP | 2002-278690 | 9/2002 |
| WO | 80/01762 | 9/1980 |
| WO | 03/019346 A1 | 3/2003 |

OTHER PUBLICATIONS

International Preliminary Report on Patentability mailed May 3, 2007 in corresponding PCT application PCT/JP2005/019391.

* cited by examiner

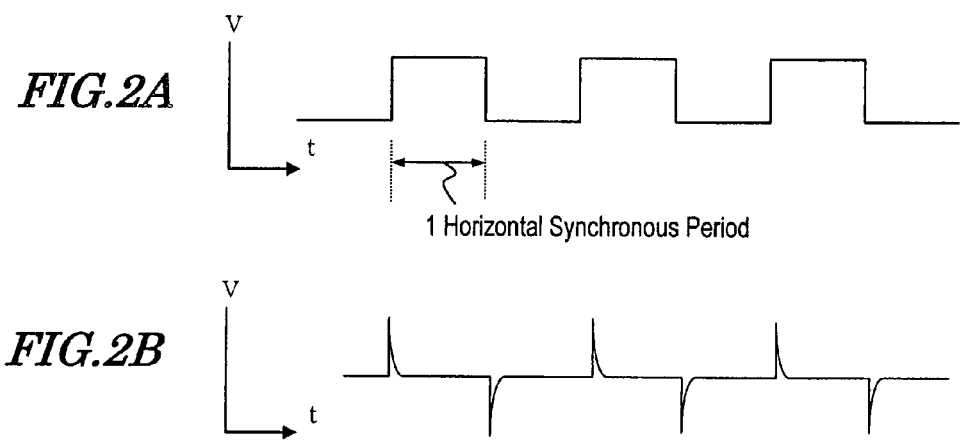
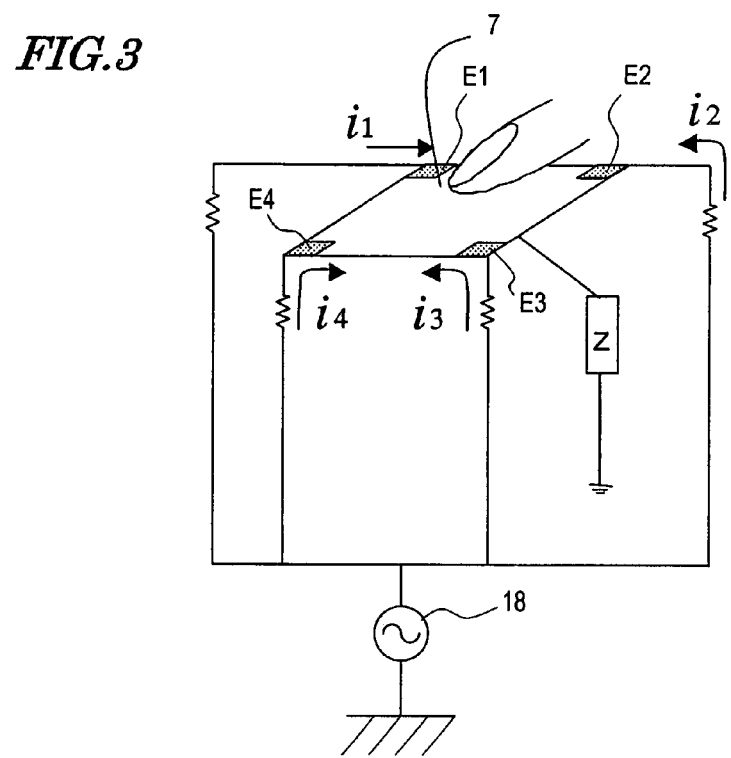

DISPLAY DEVICE WITH TOUCH SENSOR, AND DRIVE METHOD FOR THE DEVICE

This application is the U.S. national phase of International Application No. PCT/JP2005/019391 filed 21 Oct. 2005 which designated the U.S. and claims priority to JP 2004-308533 filed 22 Oct. 2004, and JP 2004-308534 filed 22 Oct. 2004 the entire contents of each of which are hereby incorporated by reference.

TECHNICAL FIELD

The present invention relates to a touch-sensored display device which is capable of detecting a position on a display surface that is contacted with a pen, a finger, or the like, and a driving method thereof.

BACKGROUND ART

A touch sensor ("touch panel") is an input device which performs position detection as to a place where contact with a finger, a pen, or the like is made, and conveys the intent of an operator to an information processing system. Known approaches of position detection are a static capacitive coupling approach, a resistive membrane approach, an infrared approach, an ultrasonic approach, an electromagnetic induction/coupling approach, and so on.

A touch sensor of the static capacitive coupling approach is disclosed in Patent Document 1, for example. A touch sensor of the static capacitive coupling approach is constructed so that terminals for position detection are formed in the four corners of a conductive film for position detection, and an AC voltage is applied to the terminals. When a contact point is formed with a finger, a pen, or the like on the conductive film for position detection, the transparent conductive film for position detection is coupled to the ground (ground plane) in a capacitive manner. By detecting values of currents flowing between the contacted portion that has established capacitive coupling and the terminals at the four corners of the transparent conductive film for position detection, the position coordinates of the contacted portion are ascertained.

In the case where a touch sensor is used in an integral form with a display device, for example, the touch sensor is to be disposed on the front face (viewer side) of a display panel such as a liquid crystal panel. In this case, there is a problem in that the touch sensor receives noise from the display panel, thus degrading the accuracy of position detection of the touch sensor. Noise from the display panel includes, for example, an induced voltage that occurs on the transparent conductive film for position detection, which is comprised in the touch sensor, responsive to a common voltage that is applied to a counter electrode, which is comprised in the liquid crystal panel.

Conventionally, in the case where a touch sensor of the static capacitive coupling approach is disposed on a liquid crystal panel, a shield layer is placed between the transparent conductive film for position detection (which is comprised in the touch sensor) and the liquid crystal panel, the shield layer preventing the touch sensor from being unfavorably affected by noise from the liquid crystal panel. Furthermore, the transparent conductive film for position detection of the touch sensor is disposed sufficiently far from the liquid crystal panel, which also suppresses the influence of noise from the liquid crystal panel.

A display device which comprises a touch sensor of the resistive membrane approach is disclosed in Patent Document 2, for example. In this publication, the timing with which output data is taken from the touch sensor is varied to ensure that noise originating in the liquid crystal panel will not be mixed in the output data.

Moreover, as a method for avoiding noise ascribable to the display signal, a method is also being practiced in which the position detection of a place of contact is performed during a blanking period, in which the display signal is absent.

On the other hand, the applicant discloses in Patent Document 3 a display device and a position detection method comprising a touch sensor of the static capacitive coupling approach, which takes advantage of a voltage which is induced in the conductive film for position detection by a voltage that is supplied to the display panel. When this construction is adopted, there is no need to provide a shield layer, so that parallax can be made smaller than conventionally.

Moreover, Patent Document 4 discloses a coordinate detection device which, in order to suppress noise influence, sets an AC voltage to be applied to the conductive film for position detection to a frequency between an $n^{th}$ order harmonic and an $(n+1)^{th}$ order harmonic of the induced voltage. Patent Document 5 discloses a coordinate input device which, in order to suppress noise influence, sets an AC voltage to be applied to the conductive film for position detection to a period in the neighborhood of 1/n of the period of the induced voltage.

[Patent Document 1] Japanese National Patent Publication No. 56-500230
[Patent Document 2] Japanese Laid-Open Patent Publication No. 9-128146
[Patent Document 3] Japanese Laid-Open Patent Publication No. 2004-21327
[Patent Document 4] Japanese Laid-Open Patent Publication No. 62-037725
[Patent Document 5] Japanese Laid-Open Patent Publication No. 62-165229

DISCLOSURE OF INVENTION

Problems to be Solved by the Invention

However, there is a problem of increased parallax in the case where a shield layer is provided between the touch sensor and the liquid crystal panel, and/or where the transparent conductive film for position detection of the touch sensor is disposed sufficiently far from the liquid crystal panel. Moreover, transmittance may decrease due to the presence of the shield layer. There is further a problem in that the display device comprising the touch sensor will become large in size, making it difficult to achieve a thin construction.

In the display device of Patent Document 2, a circuit is separately required that always monitors the sampling clock for the touch sensor and the timing of output changes in the driving signal for the liquid crystal panel, and changes the sampling clock of the touch sensor when it is possible that the driving signal output may be mixed as noise in the touch sensor signal. This results in a problem of complicating the circuitry in the device.

In the case of avoiding noise influences by performing position detection during a blanking period, the detection must be performed during a vertical blanking period because a horizontal blanking period would not provide enough time for performing the processing for noise avoidance. In order to perform position detection during a vertical blanking period, the sampling interval would be 16.7 ms in the case where the liquid crystal is driven at 60 Hz, for example. Such an interval would be too slow for the user of the touch sensor to smoothly input a contacted position. Moreover, in order to realize a method which performs position detection during this blanking period, it is necessary to know the driving timing for the liquid crystal panel, which makes necessary a separate circuit for obtaining a timing signal. This results in a problem of complicating the circuitry in the device.

As described earlier, the touch-sensored display device described in Patent Document 3 has advantages such as a smaller parallax than those of traditional touch-sensored display devices. However, since an induced voltage is utilized to replace an AC voltage source for applying an AC voltage to the conductive film for position detection, the changes in currents during contact with the touch sensor are small relative to the values of the currents which flow when touch is not being made, and it is susceptible to the influence of the state of driving (content of the display screen) of the display panel, so that a sufficient accuracy of position detection may not be obtained.

The coordinate detection device of Patent Document 4 has a problem in that noise may occur due to interference between the $2^{nd}$ order harmonic of the AC voltage which is applied to the conductive film for position detection and the $(2n+1)^{th}$ order harmonic of the induced voltage. The coordinate input device of Patent Document 5 has a problem in that noise may occur due to interference between the $n^{th}$ order harmonic of the AC voltage which is applied to the conductive film for position detection and the induced voltage.

Furthermore, a reason why conventional touch sensors of the static capacitive coupling approach have a low accuracy of position detection may be that currents steadily flow through the stray capacitances that exist when there is no contact point on the conductive film for position detection, whereby the output voltage value of the position detection circuit takes a non-zero value. For position detection, only an increment in each current which flows through a contact point when the contact point is formed should be extracted for serving as a base value for position detection. However, if there is a large current steadily flowing through the stray capacitance, thus resulting in a small increment when a contact point is formed, the output voltage value of the position detection circuit will be affected by the irregular fluctuations or variations due to external factors, thus leading to the problems of lowering of the SN ratio of a signal component to be extracted and lowering of the accuracy of position detection.

The present invention has been made in view of the above points, and a main objective thereof is to provide a display device with a touch panel, of the static capacitive coupling approach, such that the display device has a small parallax and a high accuracy of position detection.

Means for Solving the Problems

A touch-sensored display device according to the present invention is characterized by comprising: a display panel including: an active matrix substrate having a plurality of pixel electrodes, a display medium layer, and a counter substrate disposed on a viewer side of the active matrix substrate via the display medium layer, the counter substrate having a counter electrode which opposes the plurality of pixel electrodes; a display panel driving circuit for supplying display signal voltages to the plurality of pixel electrodes, and supplying to the counter electrode a common voltage which undergoes periodic inversion in polarity; a transparent conductive film for position detection, placed so as to oppose the counter electrode via the counter substrate; a plurality of terminals connected to different points on the transparent conductive film for position detection; an AC voltage generation circuit for supplying an AC voltage for position detection to the plurality of terminals; and a position data generation circuit including: a strobe signal generation circuit for generating a strobe signal which is in synchronization with a polarity inversion period of the common voltage, and a plurality of noise-cut current signal generation circuits each being connected to one of the plurality of terminals and generating a noise-cut current signal which is obtained by eliminating based on the strobe signal a predetermined portion from a current flowing from one of the plurality of terminals, the position data generation circuit generating position data of a contact point which is formed directly or indirectly on the transparent conductive film for position detection, the position data being generated based on the noise-cut current signal.

In one embodiment, each of the plurality of noise-cut current signal generation circuits includes: a current detection circuit for detecting a current flowing from one of the plurality of terminals and outputting a current signal; and a noise elimination circuit for eliminating a predetermined portion from the current signal based on the strobe signal.

In one embodiment, from the current signal which is output from the current detection circuit, the noise elimination circuit eliminates a portion containing a noise which occurs due to a polarity inversion of the common voltage.

In one embodiment, a horizontal synchronizing signal is supplied to the display panel driving circuit; and the strobe signal generation circuit generates the strobe signal based on the horizontal synchronizing signal.

In one embodiment, the strobe signal generation circuit generates a strobe signal containing a pulse which becomes active after the lapse of a predetermined time (Ts1) from a rise or fall of a pulse contained in the horizontal synchronizing signal, and which becomes inactive after the lapse of a predetermined time (Ts2) from a polarity inversion of the common voltage.

In one embodiment, the display panel driving circuit supplies to the display panel a common voltage which undergoes a polarity inversion after the lapse of a predetermined time (Tc) from a rise or fall of the horizontal synchronizing signal; and the strobe signal generation circuit generates a strobe signal containing a pulse which becomes active after the lapse of a predetermined time (Ts1) from the rise or fall of the horizontal synchronizing signal and which becomes inactive after the lapse of a predetermined time (Ts2) from the rise or fall of the horizontal synchronizing signal, where a relationship Ts1<Tc<Ts2 is satisfied.

In one embodiment, a pulse width of the strobe signal is an integer multiple of one period of the AC voltage for position detection.

In one embodiment, the AC voltage for position detection has a frequency which is an integer multiple of that of the horizontal synchronizing signal.

In one embodiment, the AC voltage for position detection has a frequency which is an integer multiple of that of the strobe signal.

In one embodiment, an inverter is further comprised, wherein, a driving frequency of the inverter is a frequency which is an integer multiple or half integer multiple of that of the horizontal synchronizing signal.

In one embodiment, the inverter is a separately-excited inverter, the driving frequency of the inverter being equal to a frequency of the AC voltage for position detection.

In one embodiment, the driving frequency of the inverter is a frequency which is an integer multiple or half integer multiple of that of the strobe signal.

In one embodiment, an A/D converter which is provided commonly for the plurality of noise-cut current signal generation circuits is further comprised, wherein the position data generation circuit generates the position data based on an output signal from the A/D converter.

In one embodiment, a plurality of sample/hold circuits for simultaneously sampling/holding output signals from the plurality of noise-cut current signal generation circuits are further comprised.

In one embodiment, each of the plurality of noise-cut current signal generation circuits has a current detection circuit for detecting a current flowing from one of the plurality of terminals and outputting a current signal, and a noise elimination circuit for eliminating a predetermined portion from the current signal based on the strobe signal; and an independent compensation element is connected to each of the plurality of current detection circuits.

In one embodiment, each of the plurality of current detection circuits has a differential amplifier, one input of the differential amplifier being electrically connected to one of the plurality of terminals, and the other input being electrically connected to the compensation element.

In one embodiment, impedances of the plurality of compensation elements are substantially equal to impedances of stray capacitances that exist when no contact point is formed on the transparent conductive film for position detection.

In one embodiment, a circuit is further comprised for retaining in an analog or digital manner the noise-cut current signal which is output from each of the plurality of noise-cut current signal generation circuits while no contact point is formed.

In one embodiment, a horizontal synchronizing signal is supplied to the display panel driving circuit; and the AC voltage for position detection has a frequency which is n times (where n is an integer) or 1/n times as large as that of the horizontal synchronizing signal, and is in synchronization with the horizontal synchronizing signal.

In one embodiment, a horizontal synchronizing signal is supplied to the display panel driving circuit; and a frequency of the AC voltage for position detection is a frequency between a first frequency which is n times (where n is an integer) or 1/n times as large as that of the horizontal synchronizing signal and a second frequency which is n+1 times or 1/(n+1) times as large as that of the horizontal synchronizing signal.

In one embodiment, the frequency of the AC voltage for position detection is set so as to be a frequency between the first frequency and the second frequency even when the frequency of the AC voltage for position detection is deviated due to an error in a constant of the AC voltage generation circuit.

In one embodiment, the frequency of the AC voltage for position detection is distant by 1 kHz or more from both the first frequency and the second frequency.

In one embodiment, a frequency which is m times (where m is an integer) or 1/m times as large as that of the AC voltage for position detection is substantially equal to a frequency which is M times (where M is an integer) or 1/M times as large as that of the horizontal synchronizing signal.

A driving method according to the present invention is a driving method for driving a touch-sensored display device which includes: a display panel including an active matrix substrate having a plurality of pixel electrodes, a display medium layer, and a counter substrate disposed on a viewer side of the active matrix substrate via the display medium layer, the counter substrate having a counter electrode which opposes the plurality of pixel electrodes; a display panel driving circuit for supplying display signal voltages to the plurality of pixel electrodes, and supplying to the counter electrode a common voltage which undergoes periodic inversion in polarity; a transparent conductive film for position detection, placed so as to oppose the counter electrode via the counter substrate; a plurality of terminals connected to different points on the transparent conductive film for position detection; an AC voltage generation circuit for supplying an AC voltage for position detection to each of the plurality of terminals; and a plurality of noise-cut current signal generation circuits each being connected to one of the plurality of terminals, wherein the driving method is characterized by comprising: a step of supplying a horizontal synchronizing signal to the display panel driving circuit; a step of supplying to the display panel the common voltage, the polarity of the common voltage being inverted at a point in time after the lapse of a predetermined period from a pulse of the horizontal synchronizing signal; a step of generating a strobe signal having a pulse which rises or falls before the predetermined period elapses since a pulse of the horizontal synchronizing signal and which falls or rises after the predetermined period has elapsed; a step of generating a plurality of noise-cut current signals obtained by eliminating a portion corresponding to the pulse of the strobe signal from a current flowing from each of the plurality of terminals; and a step of, based on the plurality of noise-cut current signals, generating position data of a contact point which is formed directly or indirectly on the transparent conductive film for position detection.

In one embodiment, the step of generating the plurality of noise-cut current signals comprises: a step of generating a plurality of current signals by detecting a current flowing from each of the plurality of terminals; and a step of eliminating a portion corresponding to the pulse of the strobe signal from each of the plurality of current signals.

In one embodiment, a step of retaining in an analog or digital manner the plurality of noise-cut current signals generated while no contact point is formed on the transparent conductive film for position detection is further comprised.

In one embodiment, a step of, based on the plurality of noise-cut current signals retained in an analog or digital manner, compensating for stray capacitances that exist when no contact point is formed on the transparent conductive film for position detection is further comprised.

In one embodiment, a step of amplifying an amount of change in current due to a contact point being formed on the transparent conductive film for position detection is further comprised.

A touch-sensored display device comprising: a display panel including: an active matrix substrate having a plurality of pixel electrodes, a display medium layer, and a counter substrate disposed on a viewer side of the active matrix substrate via the display medium layer, the counter substrate having a counter electrode which opposes the plurality of pixel electrodes; a display panel driving circuit for supplying display signal voltages to the plurality of pixel electrodes, and supplying a common voltage to the counter electrode; a transparent conductive film for position detection, placed so as to oppose the counter electrode via the counter substrate; a plurality of terminals connected to different points on the transparent conductive film for position detection; and a position data generation circuit including a plurality of current detection circuits each detecting a current flowing from one of the plurality of terminals and outputting a current signal, the position data generation circuit generating position data of a contact point which is formed directly or indirectly on the transparent conductive film for position detection, the position data being generated based on the current signals, wherein, an independent compensation element is connected to each of the plurality of current detection circuits.

In one embodiment, each of the plurality of current detection circuits has a differential amplifier, one input of the differential amplifier being electrically connected to one of the plurality of terminals, and the other input being electrically connected to the compensation element.

In one embodiment, impedances of the plurality of compensation elements are substantially equal to impedances of stray capacitances that exist when no contact point is formed on the transparent conductive film for position detection.

In one embodiment, an AC voltage generation circuit for supplying an AC voltage for position detection to the plurality of terminals is further comprised.

In one embodiment, a horizontal synchronizing signal is supplied to the display panel driving circuit; and the AC voltage for position detection has a frequency which is an integer multiple of that of the horizontal synchronizing signal.

In one embodiment, an inverter is further comprised, wherein, a driving frequency of the inverter is a frequency which is an integer multiple or half integer multiple of that of the horizontal synchronizing signal.

In one embodiment, the inverter is a separately-excited inverter, the driving frequency of the inverter being equal to a frequency of the AC voltage for position detection.

In one embodiment, an A/D converter is further comprised which is provided commonly for the plurality of current detection circuits, wherein the position data generation circuit generates the position data based on an output signal from the A/D converter.

In one embodiment, a plurality of sample/hold circuits for simultaneously sampling/holding output signals from the plurality of current detection circuits are further comprised.

A driving method according to the present invention is a driving method for driving a touch-sensored display device which includes: a display panel including an active matrix substrate having a plurality of pixel electrodes, a display medium layer, and a counter substrate disposed on a viewer side of the active matrix substrate via the display medium layer, the counter substrate having a counter electrode which opposes the plurality of pixel electrodes; a display panel driving circuit for supplying display signal voltages to the plurality of pixel electrodes, and supplying a common voltage to the counter electrode; a transparent conductive film for position detection, placed so as to oppose the counter electrode via the counter substrate; a plurality of terminals connected to different points on the transparent conductive film for position detection; and a position data generation circuit including a plurality of current detection circuits each detecting a current flowing from one of the plurality of terminals and outputting a current signal, the position data generation circuit generating position data of a contact point which is formed directly or indirectly on the transparent conductive film for position detection, the position data being generated based on the current signals, wherein the driving method is characterized by comprising: (a) a step of supplying to the display panel a common voltage whose polarity is inverted every predetermined period; (b) a step of generating position data of the contact point based on the current signals which are respectively output from the plurality of current detection circuits; and (c) a step of compensating for a stray capacitance that exists when no contact point is formed on the transparent conductive film for position detection.

In one embodiment, step (c) is performed before each of the plurality of current detection circuits detects a current flowing from one of the plurality of terminals.

In one embodiment, a step of sampling/holding for a predetermined period the current signals which are respectively output from the plurality of current detection circuits is further comprised.

In one embodiment, a step of amplifying an amount of change in current due to a contact point being formed on the transparent conductive film for position detection is further comprised.

Effects of the Invention

According to the present invention, noises that occur in currents flowing from terminals of a conductive film for position detection, due to a common voltage which is supplied to a counter electrode of a display panel and which undergoes periodic polarity inversions, are eliminated by using a strobe signal. As a result, the SN ratio is improved, and the accuracy of position detection is improved. Moreover, by generating the strobe signal based on a horizontal synchronizing signal which is supplied to the display panel, the circuit structure can be simplified.

Moreover, according to the present invention, stray capacitances occurring while no contact point is formed on the transparent conductive film for position detection are compensated for by compensation elements, whereby the accuracy of position detection is improved.

Moreover, according to the present invention, a touch-sensored display device having little parallax can be provided without having to provide a shield layer between the touch sensor and the liquid crystal panel, or place the conductive film for position detection away from the liquid crystal panel surface.

BRIEF DESCRIPTION OF DRAWINGS

FIG. 2A A diagram showing exemplary changes over time in a common voltage which is applied to a transparent counter electrode of a display panel.

FIG. 2B A diagram showing changes over time in an induced voltage which occurs on a transparent conductive film for position detection, in the case where a common voltage shown in FIG. 2A is applied to a transparent counter electrode.

FIG. 3 A diagram showing the basic principles of a position detection method according to the static capacitive coupling approach, which is adopted in the present invention.

Figure 1A:
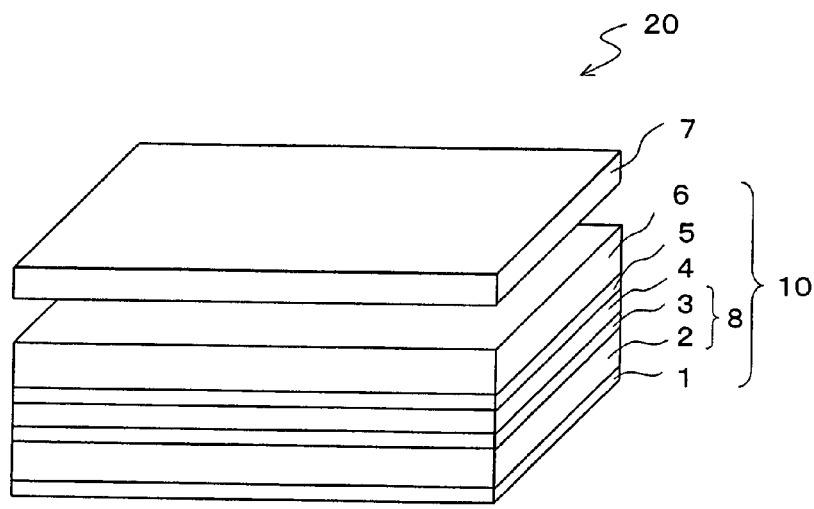
FIG. 1A A diagram schematically showing the construction of a touch-sensored display device according to one embodiment of the present invention.

DESCRIPTION OF THE REFERENCE NUMERALS 1 first polarizer
2 glass substrate
3 TFT array
4 display medium layer
5 transparent counter electrode
6 counter substrate
7 transparent conductive film for position detection
8 active matrix substrate
10 display panel
12a source driver
12b gate driver
13 FPC
14 display panel driving circuit
16 touch panel circuitry
18 AC voltage generation circuit
20 touch-sensored display device
30 noise-cut current signal generation circuit
31 current detection circuit
32 strobe signal generation circuit
33 noise elimination circuit
34 demodulation filtering circuit
35 sample/hold circuit
36 analog multiplexer
37 A/D converter
38 processing device
40 display panel driving circuit
50 position data generation circuit
132 $T_S1$ generation circuit
134 $T_S2$ generation circuit
136 timing synthesis circuit
137 frequency division circuit
138, 139 sine wave generation circuit
149 PLL circuit
144 timing generation circuit

BEST MODE FOR CARRYING OUT THE INVENTION

Hereinafter, with reference to the drawings, an embodiment of the touch-sensored display device according to the present invention will be described.

Figure 1B:
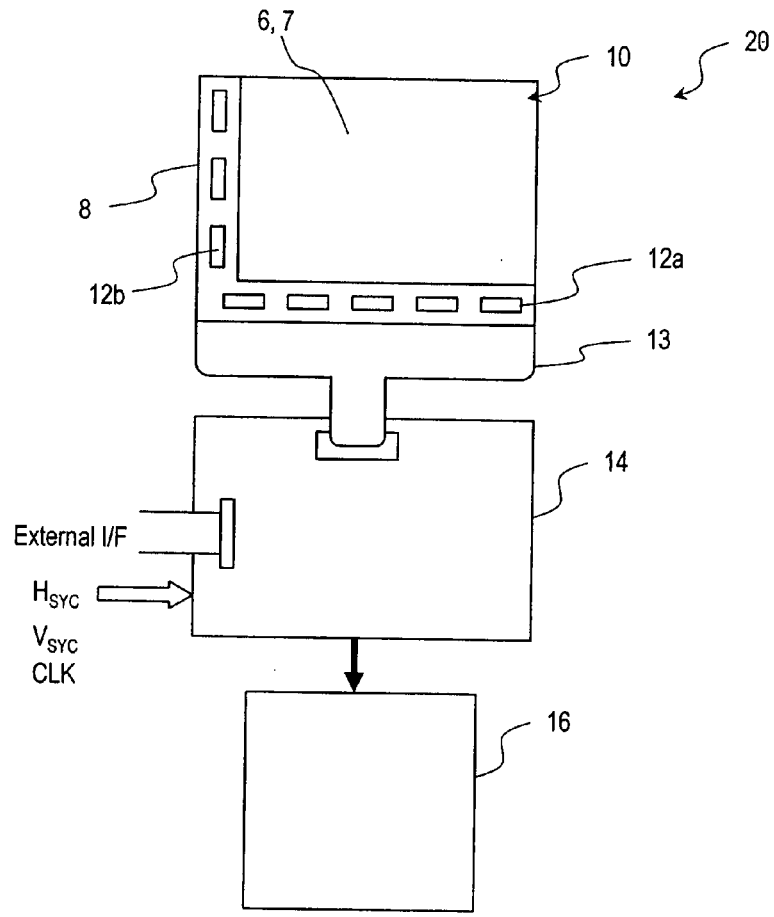
FIG. 1B A diagram schematically showing the construction of a touch-sensored display device according to one embodiment of the present invention.

FIG. 1A and FIG. 1B schematically show the construction of a touch-sensored display device 20 according to one embodiment of the present invention.

The touch-sensored display device 20 includes a display panel 10 of an active matrix-type (e.g., TFT-type), a transparent conductive film 7 for position detection, a driving circuit 14 for supplying various signals to the display panel 10, and touch panel circuitry 16. Via a FPC (flexible printed circuit) 13, the driving circuit 14 is connected to source drivers 12a and gate drivers 12b which are mounted or formed in a monolithic manner on an active matrix substrate 8 of the display panel 10. Via an external interface (I/F), predetermined signals such as a video displaying signal are supplied, and a horizontal synchronizing signal $H_{SYC}$, a vertical synchronizing signal $V_{SYC}$, a clock signal CLK (pixel clock) and the like are input to the driving circuit 14. Note that, in the case where the video signal is analog, the clock signal CLK may be generated within the driving circuit 14 by a PLL circuit, for example. Via the driving circuit 14 or directly externally, a vertical synchronizing signal $V_{SYC}$, a horizontal synchronizing signal $H_{SYC}$, and if necessary a clock signal CLK are supplied to the touch panel circuitry 16. Note that a position data generation circuit (reference numeral 50 in FIG. 4) and an AC voltage generation circuit (reference numeral 18 in FIG. 4) (to be described in detail later) are included in the touch panel circuitry 16, and the display panel driving circuit (reference numeral 40 in FIG. 6) includes the driving circuit 14, the source drivers 12a, and the gate drivers 12b. It will be appreciated that the flows of signals (i.e., interconnection between circuits) in the touch-sensored display device 20 of the present embodiment are exemplary, and can be modified to any logically equivalent interconnection.

The display panel 10 at least includes: the active matrix substrate 8 having a plurality of pixel electrodes; a display medium layer 4 composed of liquid crystal, for example; and a counter substrate (insulating layer) 6 which is disposed on the viewer side of the display medium layer 4 and on which a transparent counter electrode 5 for driving the display medium layer 4 is formed.

The transparent conductive film 7 for position detection is placed so as to oppose the transparent counter electrode 5 via the counter substrate 6 of the display panel 10. The transparent conductive film 7 for position detection is a transparent conductive film which is formed by a well-known thin-film forming technique such as sputtering, e.g., indium-tin oxide (ITO), indium-zinc oxide (IZO), tin oxide (NESA), or zinc oxide. The sheet resistance value of the transparent conductive film 7 for position detection is preferably 500 to 2000Ω/☐, and more preferably 800 to 1200Ω/☐. The film thickness of the transparent conductive film 7 for position detection is preferably 10 to 20 nm. There is no particular limitation as to the material and film formation method of the transparent conductive film 7 for position detection, and any known material or film formation method may be used. However, in order to obtain a transparent conductive film having good thermal resistance and durability, it is preferable to perform the film formation by sputtering technique using a target which contains Mg.

The transparent conductive film 7 for position detection may be formed on the surface of a separate touch sensor substrate (not shown) which is composed of glass or transparent plastic, and may be directly adhered by using an adhesive or the like, or mounted via a gap (air layer), to the outer surface (viewer side surface) of the display panel 10. In doing so, the transparent conductive film 7 for position detection may be allowed to face the display panel 10, or conversely, the touch sensor substrate may be allowed to face the display panel 10. In either case, in the construction comprising a touch sensor substrate, the display panel and the touch sensor portion are separately produced and combined at last, this being advantageous in terms of production yield and production efficiency. Furthermore, in the case where the touch sensor substrate is directly adhered to the display panel 10, an interface with air is not formed between the two, thus reducing the reflection of external light (which would hinder displaying). On the other hand, in the case where the touch sensor substrate is mounted on the outer surface of the display panel 10 with a gap, the displayed image is prevented from becoming disordered due to a pressing (associated with a contact point being formed) being directly applied to the display panel 10.

Alternatively, the transparent conductive film 7 for position detection may be formed directly on the outer surface of the counter substrate 6 of the display panel 10. This construction has an advantage in that the thickness of the entire touch-sensored display device can be reduced.

Either in the construction where a touch sensor substrate having the transparent conductive film 7 for position detection formed thereon is used or in the construction where the transparent conductive film 7 for position detection is formed directly on the outer surface of the display panel 10, a protection layer which is composed of a thin inorganic film such as $SiO_2$ or $SiNO_x$, a coating of transparent resin, or a transparent resin film such as PET or TAC may be formed on the outermost surface at the viewer side. Furthermore, an anti-reflection treatment and/or an anti-soil treatment may be performed as necessary.

At the outer periphery of a position detection area of the transparent conductive film 7 for position detection, a low-resistance conductive pattern for adjustment of the field distribution and a wiring pattern for providing connection to the external touch panel circuitry 16 (neither of which is shown) are formed by a well-known thin-film forming technique, thick-film printing technique, or the like.

As will be described later, the position data generation circuit 50 (FIG. 4) included in the touch panel circuitry 16 generates position data of a contact point, based on currents which flow from a plurality of points on the transparent conductive film 7 for position detection.

The touch-sensored display device 20 is free from the need to provide a shield layer between the counter electrode 5 and the transparent conductive film 7 for position detection, or ensure a sufficiently far distance between the counter electrode 5 and the transparent conductive film 7 for position detection, and yet the transparent conductive film 7 for position detection is placed so as to oppose the transparent counter electrode 5 via the counter substrate 6, thus resulting in little parallax. Although not only the counter substrate (glass substrate) but also a color filter layer, a polarizer, a phase plate, and the like may be provided as necessary between the counter electrode 5 and the transparent conductive film 7 for position detection, they will exert little influence on parallax because they have small thicknesses. It is preferable that the distance between the counter electrode 5 and the transparent conductive film 7 for position detection is 2 mm, for example.

In the touch-sensored display device 20, the distance between the counter electrode 5 and the transparent conductive film 7 for position detection is small. Therefore, due to a common voltage that undergoes periodic inversion in polarity, which is applied to the transparent counter electrode 5, an induced voltage occurs on the transparent conductive film 7 for position detection. As will be described later, the touch-sensored display device 20 uses a strobe signal, which is in synchronization with the polarity inversion period of the common voltage, to remove the influence of the induced voltage behaving as a noise component, and thus realizes a high accuracy of position detection.

As the display panel 10, an active matrix-type (e.g., TFT-type) liquid crystal display panel is suitably used. When there are an active matrix substrate (TFT substrate) having TFTs and pixel electrodes provided thereon and a counter substrate having a counter electrode opposing the plurality of pixel electrodes, the counter substrate is disposed on the viewer side. In order to prevent a DC voltage from being applied across the liquid crystal layer of the liquid crystal display panel and to reduce the breakdown voltage requirements for the driving ICs (gate drivers and source drivers), the polarity of the common voltage is inverted with a certain period (e.g., one horizontal synchronous period) (1H inversion). Note that the horizontal synchronous period, also referred to as a horizontal scan period, is an inverse of the horizontal synchronous frequency. As the display device 20 with a touch panel according to an embodiment of the present invention, any known TFT-type liquid crystal display panel with its driving circuit can be used. Since the construction and operation of TFT-type liquid crystal display panels and their driving circuits are well-known, detailed descriptions thereof will be omitted here.

Hereinafter, with reference to FIG. 1, the touch-sensored display device 20 according to an embodiment of the present invention will be described more specifically. The following descriptions will illustrate a case where a liquid crystal panel is used as the display panel 10.

In the case where the liquid crystal panel is used as the display panel 10, as shown in FIG. 1 for example, the display panel 10 includes not only the counter substrate 6, the transparent counter electrode 5, and the display medium layer 4 containing a liquid crystal material, but also the active matrix substrate 8 and a first polarizer 1, which are placed so as to oppose the transparent counter electrode 5 via the display medium layer 4. The active matrix substrate 8 includes a substrate 2 that is formed of a transparent material such as glass or plastic. On a principal face of the substrate 2, a TFT array 3 is formed, and pixel electrodes (not shown) are arranged in a matrix array.

The counter substrate 6 is a glass substrate or a plastic substrate, for example, and as necessary, may further include color filters and a second polarizer. The color filters and second polarizer may be disposed on the viewer side of the transparent electrode 7 for position detection. The thickness of the counter substrate 6 is no less than 0.2 mm and no more than 1.1 mm, for example, and the capacitance of a capacitor which is created between the transparent conductive film 7 for position detection, the transparent counter electrode 5, and the counter substrate 6 (insulating layer) between them is about 200 pF or more in the case of 3.7", for example. Thus, the voltage which is induced on the transparent conductive film 7 for position detection behaves as a noise component.

FIG. 2A is a diagram showing exemplary changes over time in the common voltage which is applied to the transparent counter electrode 5 of the display panel 10. The vertical axis represents the potential of the transparent counter electrode 5, and the horizontal axis represents time. Although line inversion driving (where inversion takes place every horizontal synchronous period, also referred to as 1H inversion) is illustrated herein, the present invention is not limited thereto, but may also be applied to 2-line inversion (2H inversion).

As shown in FIG. 2A, the common voltage is inverted between positive and negative polarities for every horizontal synchronous period. Note that, in the case of a TFT-type liquid crystal panel, the absolute value of the positive voltage value is not necessary equal to the absolute value of the negative voltage value. In the touch-sensored display device 20, this common voltage causes an induced voltage on the transparent conductive film 7 for position detection.

FIG. 2B shows changes over time in the induced voltage which occurs on the transparent conductive film 7 for position detection, in the case where a common voltage as shown in FIG. 2A is applied to the transparent counter electrode 5. The vertical axis represents the potential of the transparent conductive film 7 for position detection, and the horizontal axis represents time. This induced voltage is in synchronization with the voltage change of the transparent counter electrode 5 shown in FIG. 2A, and is a pulse wave which alternately takes a local maximum or a local minimum for every horizontal synchronous period. The induced voltage shown in FIG. 2B behaves as a nonnegligible noise component. For example, in one embodiment where there is a distance of 0.8 mm between the transparent counter electrode 5 and the transparent conductive film 7 for position detection, and where a voltage as shown in FIG. 2A with an amplitude of 4.9V is applied to the transparent counter electrode 5, an induced voltage as shown in FIG. 2B with an amplitude of e.g. 0.65 V may occur on the transparent conductive film 7 for position detection, depending on the environment of use.

Now, with reference to FIG. 3, the basic principles of a position detection method of the static capacitive coupling approach, which is adopted in the present invention, will be briefly described.

On the transparent conductive film 7 for position detection, terminals E1, E2, E3, and E4 for position detection are formed in the four corners, for example. Via the terminals E1, E2, E3, and E4, an AC voltage for position detection is applied to the transparent conductive film 7 for position detection from the AC voltage generation circuit 18. Although an example is illustrated where the AC voltage generation circuit 18 is commonly employed for the four terminals, this is not a limitation so long as AC voltages with the same phase and same potential can be applied. In order to be able to ascertain the position between the terminals, the number of terminal is at least two.

With a pen, a finger, etc., by touching or coming sufficiently into proximity of the surface of the transparent conductive film 7 for position detection of the touch-sensored display device 20 or a protection layer that is provided on the viewer side thereof, a contact point is formed on the transparent conductive film 7 for position detection. In the present specification, such may be expressed as forming a contact point directly or indirectly on the transparent conductive film 7 for position detection.

When a contact point is formed on the transparent conductive film 7 for position detection, the transparent conductive film 7 for position detection is coupled to the ground (ground plane) in a capacitive manner. This capacitance is, for example, a combination of: the capacitance between the protection layer and the transparent conductive film 7 for position detection; and an impedance existing between the operator and the ground.

The electric resistance values between the contacted portion that has established capacitive coupling and the terminals in the four corners of the transparent conductive film 7 for position detection are in proportion with the distances from the contacted portion to the respective terminals. Therefore, via the terminals in the four corners of the transparent conductive film 7 for position detection, currents which are generally in inverse proportion with the distances from the contacted portion to the respective terminals will flow. By detecting the sizes of these currents (relative ratio), the position coordinates of the contacted portion can be ascertained.

Assume that currents $i_1$, $i_2$, $i_3$, and $i_4$ flow in the four corners of the transparent conductive film 7 for position detection, responsive to a contact with a finger or the like (see FIG. 3). For simplicity, it is assumed that no currents will flow when a contact point is not formed on the transparent conductive film 7 for position detection. However, in actuality, currents will flow via stray capacitances also when no contact point is formed, as will be described later. Therefore, changes in currents (increments) due to the formation of a contact point must be ascertained in order to enable position detection.

The X coordinate and Y coordinate of a contacted position on the transparent conductive film 7 for position detection can be determined based on the following equations, for example.

$$X = k_1 + k_2 \cdot (i_2 + i_3)/(i_1 + i_2 + i_3 + i_4) \quad \text{(eq. 1)}$$

$$Y = k_1 + k_2 \cdot (i_1 + i_2)/(i_1 + i_2 + i_3 + i_4) \quad \text{(eq. 2)}$$

The following calculation formulae may also be used.

$$X = k_1 + k_2 \cdot [i_2/(i_2 + i_4) + i_3/(i_1 + i_3)] \quad \text{(eq. 3)}$$

$$Y = k_1 + k_2 \cdot [i_1/(i_1 + i_3) + i_2/(i_2 + i_4)] \quad \text{(eq. 4)}$$

Herein, X is the X coordinate of the contacted position on the transparent conductive film 7 for position detection, and Y is the Y coordinate of the contacted position on the transparent conductive film 7 for position detection. Moreover, $k_1$ is an offset (which is 0 in the case where the output coordinates are the origin), and $k_2$ is a magnification. $k_1$ and $k_2$ are constants which do not depend on the impedance of the operator.

Assuming that the center of the position detection area is the origin, (eq. 1) to (eq. 4) can be expressed as (eq. 5) to (eq. 8).

$$X = k \cdot (i_2 + i_3 - i_1 - i_4)/(i_1 + i_2 + i_3 + i_4) \quad \text{(eq. 5)}$$

$$Y = k \cdot (i_1 + i_2 - i_3 - i_4)/(i_1 + i_2 + i_3 + i_4) \quad \text{(eq. 6)}$$

Alternatively, the following calculation formulae may be used.

$$X = k \cdot [(i_2 - i_4)/(i_2 + i_4) - (i_1 - i_3)/(i_1 + i_3)] \quad \text{(eq. 7)}$$

$$Y = k \cdot [(i_1 - i_3)/(i_1 + i_3) + (i_2 - i_4)/(i_2 + i_4)] \quad \text{(eq. 8)}$$

Thus, the contacted position on the transparent conductive film 7 for position detection can be ascertained from the measurement values of $i_1$, $i_2$, $i_3$, and $i_4$ flowing through the four terminals. However, if a sufficient coordinate accuracy cannot be obtained from these calculation formulae alone, higher-order correction calculations may be performed as necessary.

Next, the construction of a position data generation circuit comprised in the touch-sensored display device 20 will be described. The position data generation circuit detects currents which flow from a plurality of points on the transparent conductive film 7 for position detection, and, based on the detected currents (changes responsive to the formation of the contact point), generates position data of the contact point on the transparent conductive film 7 for position detection.

Figure 4:
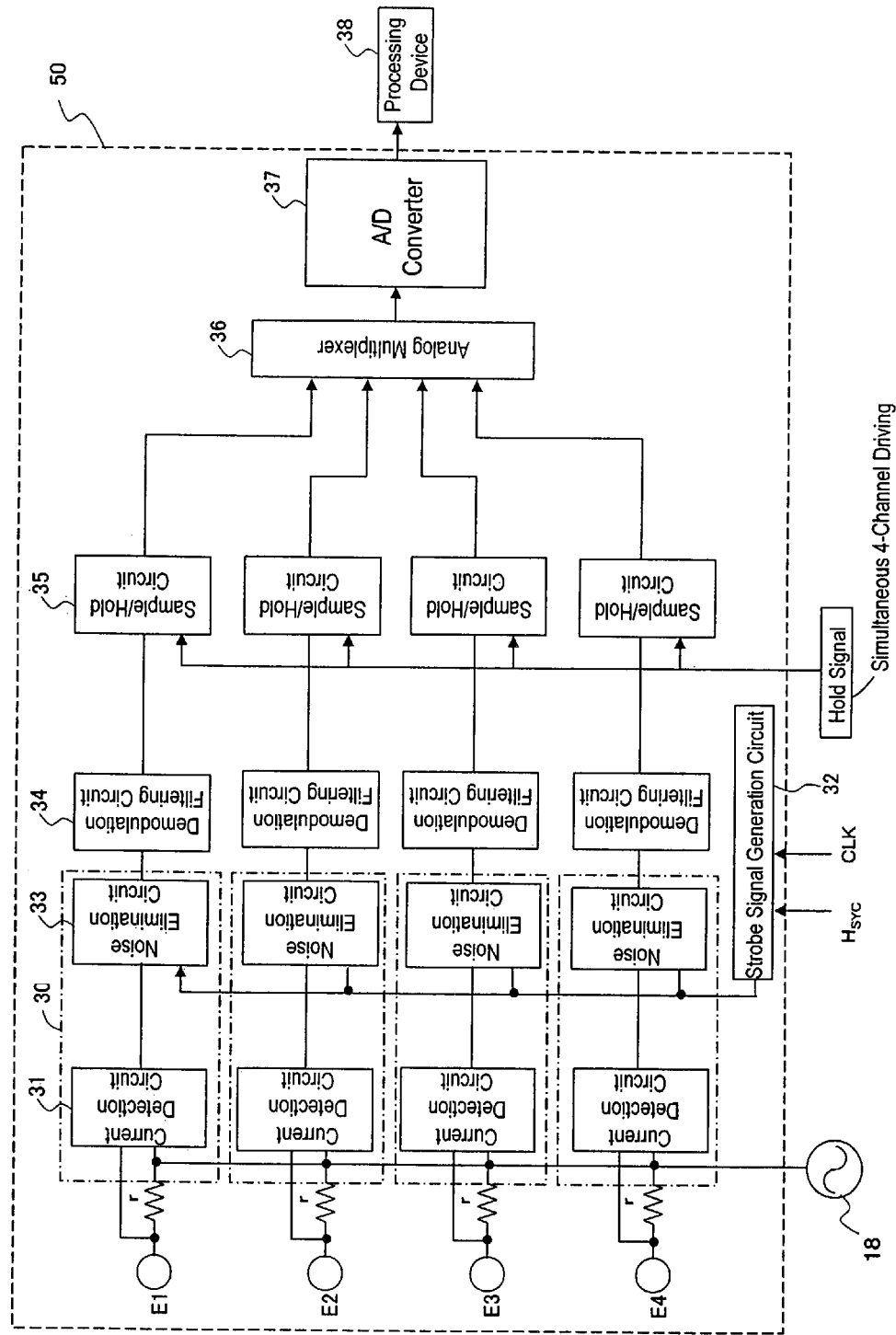
FIG. 4 A block diagram showing an example of a position data generation circuit which is comprised in a touch-sensored display device according to an embodiment of the present invention.

FIG. 4 is a block diagram showing an example of a position data generation circuit. The position data generation circuit 50 exemplified in FIG. 4 includes: a strobe signal generation circuit 32 for generating a strobe signal which is in synchronization with a polarity inversion period of the common voltage; and four noise-cut current signal generation circuits 30, each of which is connected to one of the four terminals. Based on the strobe signal, each noise-cut current signal generation circuit 30 generates a noise-cut current signal, which is obtained by eliminating a predetermined portion from the current flowing from each terminal. The position data generation circuit 50 generates position data of the contact point based on these noise-cut current signals.

An example will be illustrated where each noise-cut current signal generation circuit 30 includes: a current detection circuit 31 which detects a current flowing from each terminal and outputs a current signal; and a noise elimination circuit 33 which, based on the strobe signal, eliminates a predetermined portion from a current signal which is the output from the current detection circuit 31. However, the construction of the noise-cut current signal generation circuit 30 is not limited thereto, and the noise elimination circuit 33 may be connected between each terminal and the current detection circuit 31. Furthermore, the operation of the current detection circuit 31 may be ON/OFF-controlled based on the strobe signal.

The four noise-cut current signal generation circuits 30 illustrated herein each includes a current detection circuit 31. The four current detection circuits 31 are respectively connected to the terminals E1 to E4 in the four corners of the transparent conductive film 7 for position detection.

The current detection circuit 31 measures a current which flows between each of the four terminals E1 to E4 on the transparent conductive film 7 for position detection and the ground. Since an AC voltage for position detection is being applied to the transparent conductive film 7 for position detection, the current flowing through each of the terminals E1 to E4 responsive to a contact with a finger or the like has an AC component, and further contains as a noise component a voltage that is induced by the common voltage.

From the current signal which is output from the current detection circuit 31, the noise elimination circuit 33 eliminates noise that is associated with polarity inversion of the common voltage.

The current signal from which noise has been eliminated by the noise elimination circuit 33 (noise-cut current signal) has the same frequency component as that of the AC voltage for position detection, but may be demodulated by the demodulation filtering circuit 34 as necessary. As the demodulation filtering circuit 34, a half-wave rectification circuit, a full-wave rectification circuit, or a synchronous demodulation circuit (which relies on the frequency of the AC voltage generation circuit 18 as a reference) is included, for example. It is believed that a synchronous demodulation circuit has a higher frequency distinguishing ability than that of a CR filter or an LC filter. Moreover, the demodulation filtering circuit 34 performs filtering (band restriction) for eliminating various noises of frequencies that are different from the frequency of the AC voltage generation circuit 18, from the frequency component which is contained in the received noise-cut current signal.

The signal which is output from the demodulation filtering circuit 34 is input to a sample/hold circuit 35, and retained for a predetermined period. Via an analog multiplexer 36, the sample/hold circuit 35 sends the signal, which has been retained in synchronization with a hold signal for simultaneous 4-channel driving that is externally supplied, to a single A/D converter 37 which is provided commonly for the four sample/hold circuits 35. Thus, providing the sample/hold circuits 35 makes it possible to sequentially process the current signals of a plurality of channels (e.g., 4 channels as illustrated herein) by using the single A/D converter 37. Thus, the device construction can be simplified, thereby allowing for cost reduction. Moreover, sharing the A/D converter 37 makes it possible to reduce the variation between channels as compared to the case of providing an A/D converter 37 for each channel, whereby the accuracy of position detection is improved. This sample/hold operation may be performed in synchronization with the vertical synchronizing signal $V_{SYC}$ which is supplied to the display panel. It will be appreciated that the sample/hold circuit 35 may be omitted if the conversion speed of the A/D converter 37 is sufficiently fast.

To the A/D converter 37, the analog multiplexer 36 sends outputs which correspond to the current signals from the four terminals E1 to E4. The A/D converter 37 generates digitized current signals (digitalized current data), which are sent to a processing device 38. As used herein, the digitalized current data are the $i_1$, $i_2$, $i_3$, and $i_4$ in the aforementioned equation 1 and equation 2 having been converted into DC voltage values and further digitized.

By using these values, the processing device 38 determines the coordinates X and Y based on the aforementioned equation 1 and equation 2, interprets the input instruction from the operator who has made the contact point, and performs predetermined data processing and the like. For example, the processing device 38 is to be incorporated within car navigation apparatuses, portable information terminals (PDAs), ATMs, ticket vending machines, or various kinds of computers which comprise the display device of FIG. 1, and execute data processing.

Note that the position data generated by the position data generation circuit 50 is not limited to the above example. For example, the position data generation circuit 50 may determine X and Y coordinates by using the aforementioned digitized DC voltage values, and output them as position data.

Next, the operation of each noise elimination circuit 33 comprised in the position data generation circuit 50 of the present embodiment will be specifically described.

By using the strobe signal which is supplied from the strobe signal generation circuit 32, the noise elimination circuit 33 eliminates the noise component, ascribable to polarity inversion of the common voltage, that is contained in the current signal which is output from the current detection circuit 31.

Figure 5:
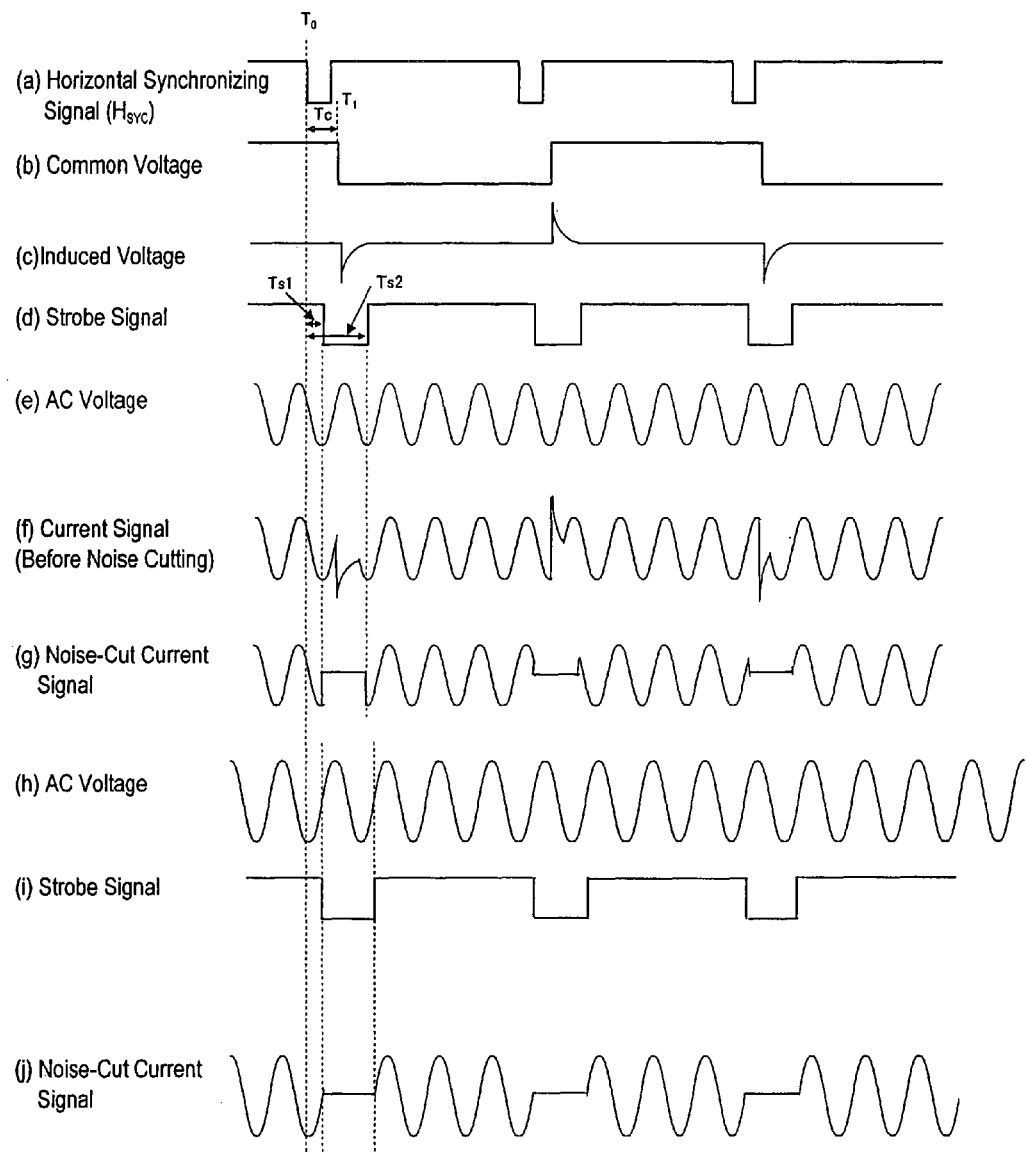
FIG. 5 A diagram for explaining an operation of a noise elimination circuit 33, where: (a) shows a waveform of a horizontal synchronizing signal $H_{SYC}$ for a display panel; (b) shows a waveform of a common voltage which is supplied to a counter electrode; (c) shows a waveform of an induced voltage which is induced on a conductive film for position detection; (d) shows a waveform of a strobe signal; (e) shows a waveform of an AC voltage for position detection; (f) shows a waveform of a current signal on which the noise component shown in (c) is superposed; (g) shows a waveform of a current signal which is obtained by eliminating a noise component from the current signal waveform shown in (f) (waveform of a noise-cut current signal); (h) shows a waveform of an AC voltage for position detection which has a frequency that is an integer multiple of the horizontal synchronizing signal $H_{SYC}$ and which is in synchronization with the horizontal synchronizing signal $H_{SYC}$; (i) shows a waveform of a strobe signal having a pulse width which corresponds to one period of the AC voltage for position detection shown in (h); and (j) shows a waveform of a noise-cut current signal which is obtained by eliminating the noise component by using the strobe signal shown in (i).

FIG. 5 is a diagram for explaining an operation of the noise elimination circuit 33. FIG. 5(*a*) shows a waveform of the horizontal synchronizing signal $H_{SYC}$ for the display panel. FIG. 5(*b*) shows a waveform of the common voltage which is supplied to the counter electrode. FIG. 5(*c*) shows a waveform of an induced voltage (noise component) which is induced on the conductive film for position detection. FIG. 5(*d*) shows a waveform of the strobe signal. FIG. 5(*e*) shows a waveform of the AC voltage for position detection. FIG. 5(*f*) shows a current signal waveform (before noise cutting) on which the noise component shown in FIG. 5(*c*) is superposed.

FIG. 5(g) shows a waveform of a current signal which is obtained by eliminating the noise component from the current signal waveform shown in FIG. 5(f) (waveform of a noise-cut current signal). FIG. 5(h) shows a waveform of an AC voltage for position detection which has a frequency that is an integer multiple (e.g., four-times multiple) of the horizontal synchronizing signal $H_{SYC}$ and which is in synchronization with the horizontal synchronizing signal $H_{SYC}$; FIG. 5(i) shows a waveform of a strobe signal having a pulse width which corresponds to one period of the AC voltage for position detection shown in FIG. 5(h); and FIG. 5(j) shows a waveform of a noise-cut current signal which is obtained by eliminating the noise component by using the strobe signal shown in FIG. 5(i).

The pulse width of the strobe signal may be a pulse width which is an integer multiple of one period of the AC voltage for position detection. In the case where the phase relationship between the rising edge and the falling edge of the strobe signal shown in FIG. 5(d) and the AC voltage for position detection shown in FIG. 5(e) is not fixed, steep changes in the waveform occur before and after where the noise component is removed from the noise-cut current signal, as shown in FIG. 5(g). On the other hand, in the case where the timing of the rising edge and falling edge of the strobe signal (FIG. 5(i)) is adjusted so as to match the timing with which the AC voltage for position detection as shown in FIG. 5(h) crosses the zero voltage, the steep changes in the waveform before and after where the noise component is removed are eliminated as shown in FIG. 5(j), whereby the SN ratio is improved. Note that the horizontal synchronous frequency is e.g. 15.75 kHz (NTSC, EGA, QVGA) or 31.5 kHz (VGA, wide VGA), and the vertical synchronous frequency is e.g. 60 Hz.

In a liquid crystal panel which is driven by 1H inversion, the polarity of the common voltage is inverted as shown in FIG. 5(b), in synchronization with the horizontal synchronizing signal $H_{SYC}$ shown in FIG. 5(a). The point in time $T_1$ at which the polarity of the common voltage is inverted is set a predetermined time (Tc) after a pulse of the horizontal synchronizing signal. This time Tc is typically determined with reference to a falling (or rising, in the case where the polarity of the pulse of the horizontal synchronizing signal is opposite to that which is shown) point in time $T_0$ of a pulse of the horizontal synchronizing signal. In some cases, it is determined with reference to a rising (or falling, in the case where the polarity of the pulse of the horizontal synchronizing signal is opposite to that which is shown) point in time of a pulse the horizontal synchronizing signal. It may be arbitrary decided, and is generally determined by the system which supplies various signals to the display device, as to whether to employ a positive pulse or a negative pulse and whether to use a rising edge or a falling edge as a reference.

In a liquid crystal panel which is driven by 2H inversion, the polarity of the common voltage is inverted with an interval which is twice as large as the horizontal synchronous period (2H). Accordingly, the period of the strobe signal is 2H, so that the frequency of the strobe signal is ½ of the horizontal synchronous frequency. Otherwise, everything is the same as in 1H inversion driving.

When the polarity of the common voltage is inverted, the voltage (induced voltage) which is induced on the conductive film for position detection goes through a transient change as shown in FIG. 5(c), and a noise component which is in synchronization with the polarity inversion of the common voltage is generated. Such transient voltage changes (noise components) cause the value of the current which flows from the conductive film for position detection to the current detection circuit 31 to vary, as shown in FIG. 5(f), and therefore are a cause for a decrease in the position detection accuracy.

In the position data generation circuit 50 of the present embodiment, the noise elimination circuit 33 eliminates the aforementioned noise component from the current signal which is output from the current detection circuit 31 by using the strobe signal shown in FIG. 5(d).

The strobe signal shown in FIG. 5(d) has a pulse which becomes active (e.g., falls) at a point in time after the lapse of a predetermined period Ts1 from the falling point $T_0$ of a pulse of the horizontal synchronizing signal $H_{SYC}$, and which becomes inactive (e.g., rises) at a point in time after the lapse of a predetermined period Ts2 from the falling point $T_0$ of the pulse of the horizontal synchronizing signal $H_{SYC}$. Thus, a strobe signal is prepared which contains pulses each having a width (pulse width=Ts2−Ts1) that includes a transient period during which a voltage change due to the aforementioned noise component occurs. As used herein, "active" means the noise-cutting function being activated, and means placing the output of an analog switch 31b in an "OFF" state in an exemplary circuit shown in FIG. 8. "Inactive" means placing this analog switch in an "ON" state.

Next, based on this strobe signal, the noise component (FIG. 5(c)) is eliminated from the current signal shown in FIG. 5(f), whereby the noise-cut current signal shown in FIG. 5(g) is obtained. For example, by inputting to the analog switch 31b of FIG. 8 the strobe signal and the current signal having been output from the current detection circuit 31, an output consisting of the current signal from which the portion corresponding to a pulse of the strobe signal has been removed, i.e., the noise-cut current signal (FIG. 5(g)), can be obtained.

Note that the AC voltage for position detection preferably has a frequency which is an integer multiple of that of the horizontal synchronizing signal $H_{SYC}$. When thus set, the AC voltage for position detection will have a frequency which is an integer multiple of the frequency of the strobe signal. After thus setting the frequency of the AC voltage for position detection, the AC voltage for position detection and the horizontal synchronizing signal $H_{SYC}$ are placed in synchronization with each other (phase-matched) as shown in FIG. 5(h), and the pulse width of the strobe signal is prescribed to be an integer multiple of one period of the AC voltage for position detection as shown in FIG. 5(i). As a result, the noise-cut current signal as shown in FIG. 5(j) can be obtained, in which the current signal is cut with a given timing, and noise due to an interference between the current signal and the horizontal synchronizing signal $H_{SYC}$ (i.e., interference between the AC voltage for position detection and the common voltage) is prevented.

When the AC voltage for position detection has a frequency which is an integer multiple of that of the horizontal synchronizing signal $H_{SYC}$, and is in synchronization with the horizontal synchronizing signal $H_{SYC}$, noise due to an interference between the AC voltage for position detection and the horizontal synchronizing signal can be prevented. Similarly, when the AC voltage for position detection has a frequency which is 1/integer of that of the horizontal synchronizing signal $H_{SYC}$, and is in synchronization with the horizontal synchronizing signal $H_{SYC}$, noise due to an interference between the AC voltage for position detection and the horizontal synchronizing signal can be prevented.

A transmission-type liquid crystal display device has a backlight, and an inverter for the backlight. The driving frequency of the inverter is preferably an integer multiple or a half integer multiple of that of the horizontal synchronizing signal $H_{SYC}$. Moreover, the driving frequency of the inverter is an integer multiple or a half integer multiple of that of the strobe signal. Inverters are classified into those which are self-excited and those which are separately-excited. The oscillation frequency of a self-excited inverter is likely to fluctuate under the influences of the power voltage and load fluctuations in the fluorescent discharge tube used as a backlight, thus making it difficult to satisfy the aforementioned condition. On the other hand, the oscillation frequency of a separately-excited inverter is controlled by an external oscillation circuit. Therefore, by appropriately frequency-dividing the clock signal CLK or using the horizontal synchronizing signal as a source oscillation, the phase relationship with respect to the current signal and the video signal is fixed, whereby decrease in the accuracy of position detection, interference for the display screen, etc., can be suppressed. In the case where the horizontal synchronous frequency is 31.5 kHz, the driving frequency of an inverter is an integer multiple or a half integer multiple thereof, e.g., 15.75 kHz, 31.5 kHz, 47.25 kHz, or 63 kHz. In the case where the horizontal synchronous frequency is 15.75 kHz, any frequency which is intermediate between such frequencies may also be used. The driving frequency of the inverter may be equal to the frequency of the AC voltage for position detection.

The strobe signal can be generated by using various known circuits. However, by using a signal which is used by the driving circuit of a liquid crystal display panel or a signal generated by the driving circuit, the circuit structure can be simplified and the cost can be reduced.

Figure 6A:
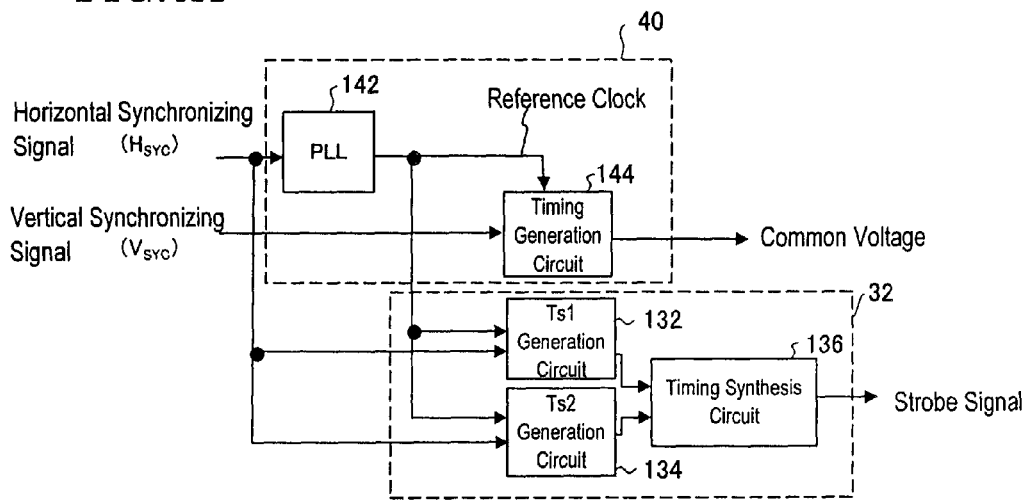
FIG. 6A A diagram showing the construction of a strobe signal generation circuit for analog driving.
Figure 6B:
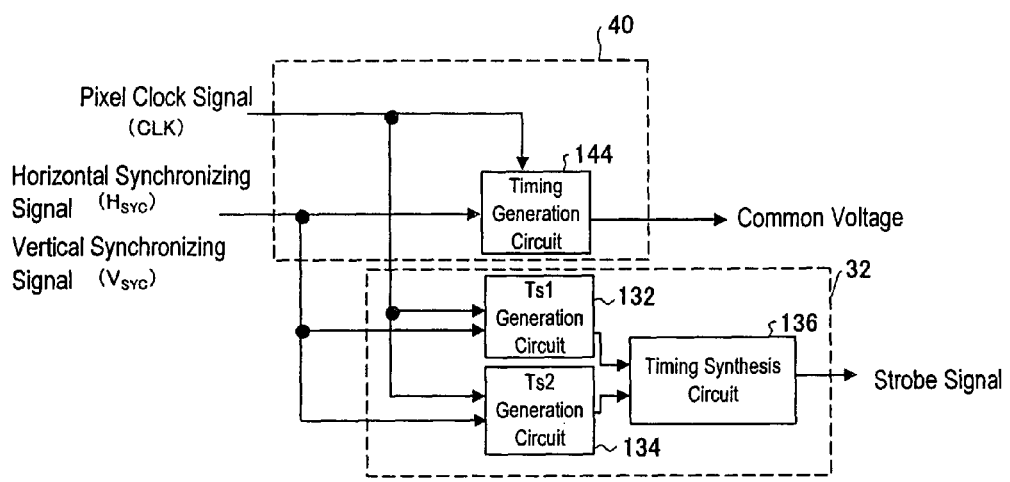
FIG. 6B A diagram showing the construction of a strobe signal generation circuit for digital driving.

For example, a strobe signal can be generated by using a signal which is used by a display panel driving circuit 40 as shown in FIG. 6A and FIG. 6B. FIG. 6A illustrates a case where the display panel driving circuit 40 is of a type to which analog signals are input, whereas FIG. 6B illustrates a case where the driving circuit 40 is of a type to which digital signals are input. Note that, although omitted from FIG. 6A and FIG. 6B for simplicity, the display panel driving circuit 40 has necessary circuitry, such as source drivers (also referred to as data line driving circuits or column driving circuits) and gate drivers (also referred to as scanning line driving circuits or row driving circuits) for supplying display signal voltages (also referred to as video signals or gray-scale signals) to the plurality of pixel electrodes.

To the display panel driving circuit 40 shown in FIG. 6A, which is of a type to which analog signals are input, a vertical synchronizing signal $V_{SYC}$ and a horizontal synchronizing signal $H_{SYC}$ are supplied. In the case where a reference clock signal is not externally supplied to the driving circuit 40, a reference clock signal (i.e., a signal having a higher frequency than that of the horizontal synchronizing signal $H_{SYC}$, typically a pixel clock signal) is generated by a PLL circuit 142, for example. The reference clock signal is used for controlling the source drivers and the like. The timing generation circuit 144, to which the reference clock signal and the vertical synchronizing signal $V_{SYC}$ are input, generates a common voltage whose polarity is inverted in synchronization with the horizontal synchronizing signal by using e.g. an FF circuit, and supplies the common voltage to the counter electrode. The common voltage is inverted in polarity for every horizontal synchronous period or every two horizontal synchronous periods, for example. Furthermore, the common voltage is inverted in polarity for every field, in synchronization with the vertical synchronizing signal $V_{SYC}$.

The strobe signal generation circuit 32 includes a Ts1 generation circuit 132, a Ts2 generation circuit 134, and a timing synthesis circuit 136. Based on the reference clock signal and the horizontal synchronizing signal $H_{SYC}$ which are supplied to the Ts1 generation circuit 132 and the Ts2 generation circuit 134 via the driving circuit 40, the strobe signal generation circuit 32 generates signals defining Ts1 and Ts2, which are combined by the timing synthesis circuit 136 to generate the strobe signal shown in FIG. 5(d).

The time slots Ts1, Ts2, and Tc may be generated by a one-shot multivibrator, but their timing may also be determined by counting the reference clock signal.

In order to control the display panel 10, it is necessary to generate various signals, other than those mentioned above, for controlling the gate drivers and the source drivers in synchronization with external signals. Although such a signal generation circuit may be composed of a discrete part, it is common practice to employ a dedicated single-chip gate array (generally referred to as a timing generator or a controller) in mass-produced products. The strobe signal generation circuit 32 can also be incorporated into this dedicated gate array for realizing a single chip construction.

To the driving circuit 40 for digital driving shown in FIG. 6B, a pixel clock signal is supplied as the clock signal CLK. The pixel clock signal would correspond to the reference clock signal in a circuit for analog driving, and is in synchronization with the horizontal synchronizing signal $H_{SYC}$. The driving circuit 40 for digital driving shown in FIG. 6B does not need to have a PLL circuit as does the driving circuit 40 shown in FIG. 6A, and is able to generate a common voltage based on the vertical synchronizing signal $V_{SYC}$, the horizontal synchronizing signal $H_{SYC}$, and an image clock signal CLK. The strobe signal generation circuit 32 is also able to generate a strobe signal based on the image clock signal CLK and the horizontal synchronizing signal $H_{SYC}$, in a manner similar to the above. In this case, too, the time slots Ts1, Ts2, and Tc may be generated by a one-shot multivibrator, or their timing may be determined by counting a reference clock signal, as in the case of the driving circuit for a display panel of a type to which analog signals are input. In mass-produced products, these time slots are to be generated by a dedicated gate array.

Figure 6C:
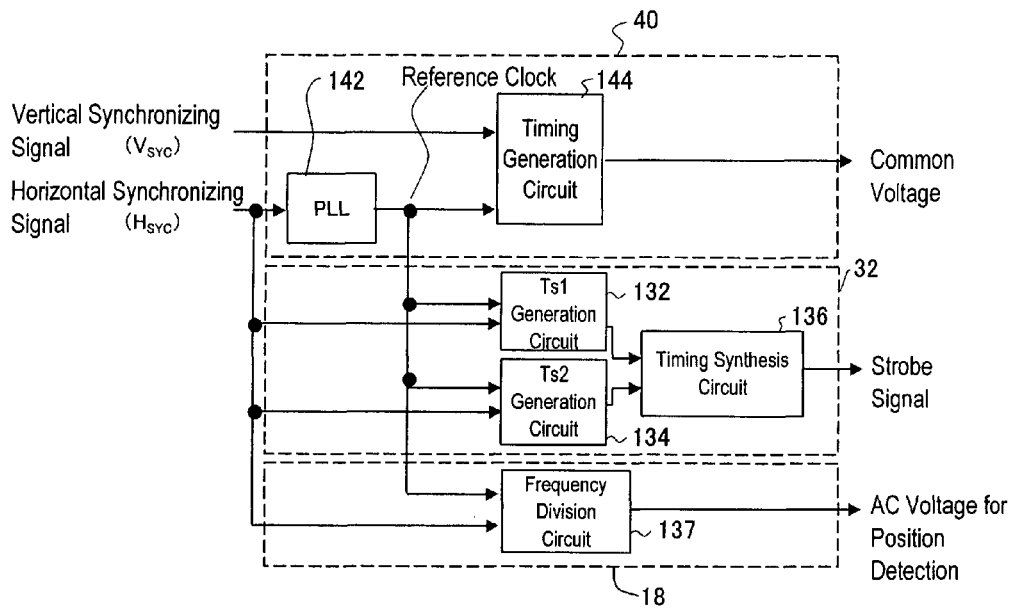
FIG. 6C A diagram showing an exemplary construction of a circuit which generates the AC voltage for position detection shown in FIG. 5(h).
Figure 6D:
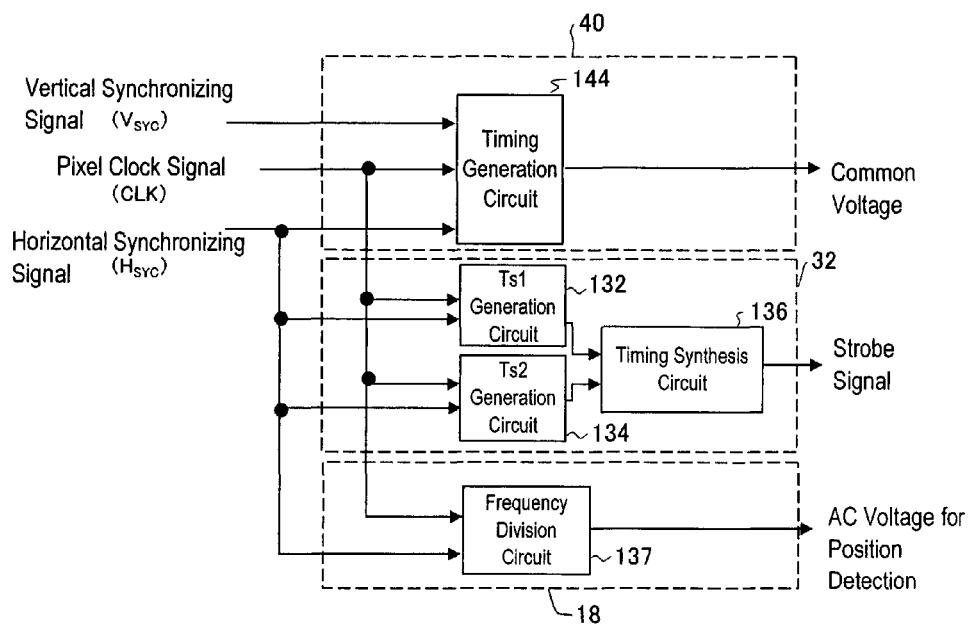
FIG. 6D A diagram showing an exemplary construction of a circuit which generates the AC voltage for position detection shown in FIG. 5(h).
Figure 6E:
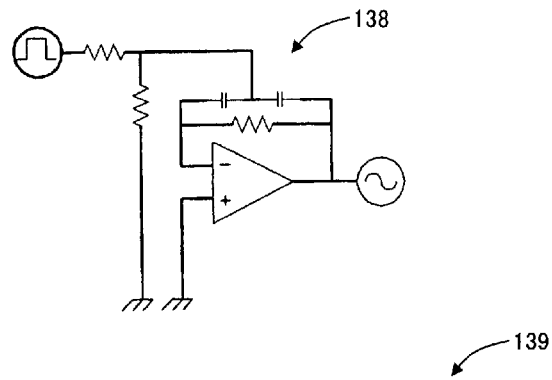
FIG. 6E A diagram showing a sine wave generation circuit according to an embodiment of the present invention.

Examples of methods for fixing the frequency of the AC voltage for position detection to a frequency which is an integer multiple of the strobe signal include: a method of generating the AC voltage for position detection by frequency-dividing a reference clock signal which is output from a PLL circuit 142 as shown in FIG. 6C; and a method of generating the AC voltage for position detection by frequency-dividing the clock signal CLK as shown in FIG. 6D.

Referring to FIG. 6C, the AC voltage generation circuit 18 includes a frequency division circuit 137. A reference clock signal which is generated from the horizontal synchronizing signal $H_{SYC}$ is input to the frequency division circuit 137. The frequency division circuit 137 generates an AC voltage for position detection by frequency-dividing the reference clock signal. In the example shown in FIG. 6D, the frequency division circuit 137 generates an AC voltage for position detection by frequency-dividing a pixel clock signal CLK, instead of a reference clock signal.

By generating an AC voltage for position detection through frequency-dividing a reference clock signal (or a pixel clock signal CLK), it becomes possible to generate an AC voltage for position detection having a frequency which is n times (where n is an integer) or 1/n times as large as that of the horizontal synchronizing signal $H_{SYC}$, and which is in synchronization with the horizontal synchronizing signal $H_{SYC}$. Since the common voltage is also generated by using a reference clock signal (or a pixel clock signal CLK), the period of the AC voltage for position detection is n' times (where n' is an integer) or 1/n' times as large as the polarity inversion period of the common voltage, and is in synchronization with the polarity inversion period of the common voltage.

Note that, using a dot clock signal as a reference clock signal, the AC voltage for position detection may be generated by frequency-dividing the dot clock signal. In the case of a video signal complying with the NTSC system, the PAL system, or the like is used, the AC voltage for position detection may be generated by frequency-dividing a color carrier that is contained in the video signal. In the case where the frequency-divided wave obtained by such frequency-division is a square wave, a sine wave which is in synchronization with the square wave can be generated by using a sine wave generation circuit 138 shown in FIG. 6E, for example. As a result, an AC voltage for position detection having a sinusoidal waveform can be obtained. For example, the sine wave generation circuit 138 may be incorporated in the frequency division circuit 137, or disposed on the output side of the frequency division circuit 137.

In the case where the AC voltage for position detection and the horizontal synchronizing signal $H_{SYC}$ are not in synchronization but are close to each other in frequency, noise may occur due to an interference between the AC voltage for position detection and the horizontal synchronizing signal $H_{SYC}$ (i.e., interference between the AC voltage for position detection and the common voltage). Since such interference noise would cause a decrease in the accuracy of position detection, it is desirable to set the frequency of the AC voltage for position detection so that the interference noise will not be generated.

Figure 7:
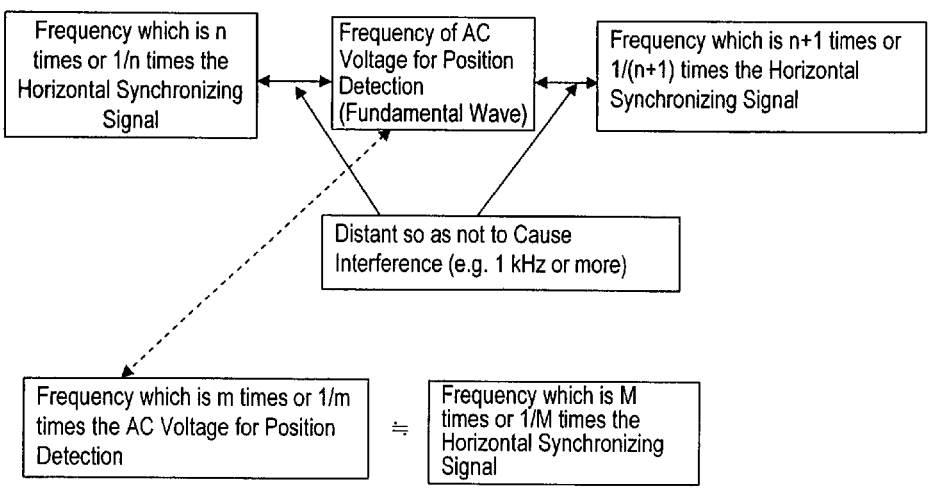
FIG. 7 A diagram showing a relationship between frequency of the horizontal synchronizing signal $H_{SYC}$ and frequency of the AC voltage for position detection according to an embodiment of the present invention.

Referring to FIG. 7, the inventors have found that it is possible to suppress the interference between the AC voltage for position detection and the horizontal synchronizing signal $H_{SYC}$ by setting the frequency of the AC voltage for position detection so as to be between a first frequency which is n times (where n is an integer) or 1/n times as large as that of the horizontal synchronizing signal $H_{SYC}$ and a second frequency which is n+1 times or 1/(n+1) times as large as that of the horizontal synchronizing signal $H_{SYC}$, and also setting the frequency of the AC voltage for position detection at a frequency which is distant by a predetermined frequency (e.g., 1 kHz) or more from both the first frequency and the second frequency. Moreover, the inventors have found that, by setting the frequency of the AC voltage for position detection so that a frequency which is m times (where m is an integer) or 1/m times as large as that of the AC voltage for position detection is substantially equal to a frequency which is M times (where M is an integer) or 1/M times as large as that of the horizontal synchronizing signal $H_{SYC}$, it becomes possible to further suppress the interference between the AC voltage for position detection and the horizontal synchronizing signal $H_{SYC}$. As used herein, "substantially equal" means, for example, the frequency values being equal with respect to their higher two digits.

As an example, a method for setting the frequency of the AC voltage for position detection in the case of employing a video signal according to the NTSC system will be described.

First, an example where the horizontal synchronizing signal $H_{SYC}$ has a frequency 15.73426374 kHz and the AC voltage for position detection is set to a frequency near 45 kHz will be described.

The frequency of the AC voltage for position detection is set so as to be between a first frequency which is n times as large as that of the horizontal synchronizing signal $H_{SYC}$ and a second frequency which is n+1 times as large as that of the horizontal synchronizing signal $H_{SYC}$, the frequency of the AC voltage for position detection being set to a frequency which is distant by 1 kHz or more from both the first frequency and the second frequency. In order to ensure that the frequencies of the $n^{th}$ order harmonic and $n+1^{st}$ order harmonic of the horizontal synchronizing signal $H_{SYC}$ are near 45 kHz, the value of n is 2. When n=2,
($2^{nd}$ order harmonic of horizontal synchronizing signal) ≈31.47 kHz;
($3^{rd}$ order harmonic of horizontal synchronizing signal) ≈47.20 kHz;
31.47 kHz+1 kHz=32.47 kHz; and
47.20 kHz−1 kHz=46.20 kHz.
Thus, by setting the AC voltage for position detection so that 32.47 kHz≦(AC voltage for position detection)≦46.20 kHz, the interference between the AC voltage for position detection and the horizontal synchronizing signal $H_{SYC}$ can be suppressed.

In order to further suppress interference, the frequency of the AC voltage for position detection is set so that a frequency which is m times as large as that of the AC voltage for position detection is substantially equal to a frequency which is M times as large as that of the horizontal synchronizing signal $H_{SYC}$. Assuming that hardly any interference noise occurs due to the $7^{th}$ order harmonic or higher harmonics of the AC voltage for position detection, the value of m is 7. When m=7,
($7^{th}$ order harmonic)=45 kHz×7=315 kHz
($20^{th}$ order harmonic of horizontal synchronizing signal) ≈314.69 kHz≈315 kHz,
and therefore M=20. Since 314.69 kHz/7=44.96 kHz, interference can be further suppressed by setting the AC voltage for position detection at 44.96 kHz.

Moreover, in consideration of the fact that the frequencies at which hardly any interference noise occurs are equal to or greater than the frequency of the $7^{th}$ order harmonic, the lower limit frequency of the AC voltage for position detection may be set to 44.96 kHz, thus setting the AC voltage for position detection so that 44.96 kHz≦(AC voltage for position detection)≦46.20 kHz.

Next, an example where the horizontal synchronizing signal $H_{SYC}$ has a frequency of 15.73426374 kHz and the AC voltage for position detection is set to a frequency near 6.5 kHz will be described.

The frequency of the AC voltage for position detection is set so as to be between a first frequency which is 1/n times as large as that of the horizontal synchronizing signal $H_{SYC}$ and a second frequency which is 1/(n+1) times as large as that of the horizontal synchronizing signal $H_{SYC}$, the frequency of the AC voltage for position detection being set to a frequency which is distant by 1 kHz or more from both the first frequency and the second frequency. In order to ensure that the first frequency and the second frequency are near 6.5 kHz, the value of n is 2. When n=2,
(second subharmonic of horizontal synchronizing signal) ≈7.867 kHz;
(third subharmonic of horizontal synchronizing signal) ≈5.245 kHz;
7.867 kHz−1 kHz=6.867 kHz; and
5.245 kHz+1 kHz=6.245 kHz.
Thus, by setting the AC voltage for position detection so that 6.245 kHz≦(AC voltage for position detection)≦6.867 kHz, the interference between the AC voltage for position detection and the horizontal synchronizing signal $H_{SYC}$ can be suppressed.

In order to further suppress interference, the frequency of the AC voltage for position detection is set so that a frequency which is 1/m times as large as that of the AC voltage for position detection is substantially equal to a frequency which is 1/M times as large as that of the horizontal synchronizing signal $H_{SYC}$. Assuming that hardly any interference noise occurs due to subharmonics equal to or lower than a frequency which is 1/7 as large as that of the AC voltage for position detection, the value of m is 7. When m=7,
(seventh subharmonic)=6.5 kHz/7≈0.9286 kHz;
(seventeenth subharmonic of horizontal synchronizing signal)≈0.9255 kHz≈0.9286 kHz,
and therefore M=17. Since 0.9255 kHz×7=6.479 kHz, interference can be further suppressed by setting the AC voltage for position detection at 6.479 kHz.

Moreover, in consideration of the fact that the frequencies at which hardly any interference noise occurs are equal to or lower than the frequency of the seventh subharmonic, the upper limit frequency of the AC voltage for position detection may be set to 6.479 kHz, thus setting the AC voltage for position detection so that 6.245 kHz≦(AC voltage for position detection)≦6.479 kHz.

The above are examples of frequency setting methods in the case of employing an NTSC system display panel of a type to which analog signals are input. Also in the case of employing PAL system, SECAM system, etc., display panels of a type to which analog signals are input, or display panels of a type to which digital signals are input, interference can be suppressed by setting the frequency of the AC voltage for position detection with a setting method similar to the above.

Figure 6F:
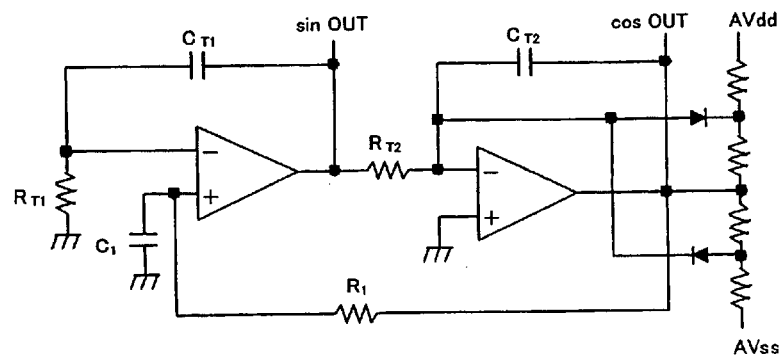
FIG. 6F A diagram showing a sine wave generation circuit according to an embodiment of the present invention.

It becomes possible to set the AC voltage for position detection to the aforementioned value ranges by setting the constants of parts that are comprised in the AC voltage generation circuit (capacitors, resistors, etc.) to appropriate values. For example, suppose that the AC voltage generation circuit 18 includes a sine wave generation circuit 139 as shown in FIG. 6F. The sine wave generation circuit 139 is a self-excited oscillation circuit, whose oscillation frequency $f_0$ is expressed as $f_0 = 1/2\pi\sqrt{(R_{T1} \cdot C_{T1} \cdot R_{T2} \cdot C_{T2})}$. By setting $R_{T1}$, $C_{T1}$, $R_{T2}$, and $C_{T2}$ to appropriate values, the desired oscillation frequency $f_0$ (i.e., frequency of the AC voltage for position detection) can be obtained.

Note that errors in the constants of component elements in the AC voltage generation circuit may occur depending on the environment of use, thus allowing the frequency of the AC voltage for position detection to be slightly deviated. In such cases, too, it is desirable to set the representative value of the frequency of the AC voltage for position detection so that the frequency of the AC voltage for position detection will fall within the aforementioned value ranges.

As described above, the position data generation circuit 50 of the present embodiment generates a strobe signal by using signals which are used for driving the liquid crystal display panel, and is capable of efficiently eliminating noise associated with the polarity inversions of the common voltage by using this strobe signal.

On the other hand, the position data generation circuit (detection circuit) described in Patent Document 3 does not include an AC voltage source for position detection. As shown in FIG. 4 of the publication, a current signal which is output from a current detection circuit is, without eliminating therefrom a signal corresponding to a voltage that is induced by the common voltage, input to an analog signal processing circuit and subjected to amplification and bandpass-filtering processes. Thereafter, the output signal from the analog signal processing circuit is demodulated by a demodulation filtering circuit, whereby various noises are removed. The output signal from the demodulation filtering circuit is input to a noise eliminating DC conversion circuit for rectification, and a signal having a value which is in proportion with a current flowing through each terminal is generated.

Moreover, Patent Document 3 describes in paragraphs [0054] to [0058] an example of a time division operation between a display mode period T1 and a position detection mode period T2. However, in this example, the position detection mode period T2 must be allocated to a period other than the display mode period T1. In other words, its underlying technological concept is to make effective use of the non-displaying period. The present invention differs from Patent Document 3 in its objective of improving the accuracy of position detection by eliminating a voltage that is induced by the common voltage, whose polarity is inverted during a non-displaying period (which is generally a horizontal blanking period).

Figure 9:
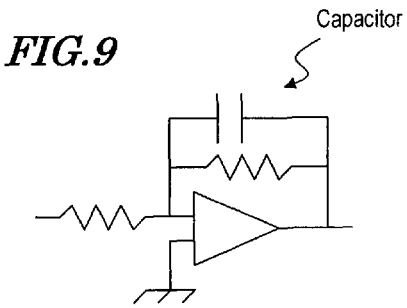
FIG. 9 A diagram showing an amplification circuit (low-pass filter) which is included in a noise eliminating DC conversion circuit of a conventional detection circuit (position data generation circuit).
Figure 10A:
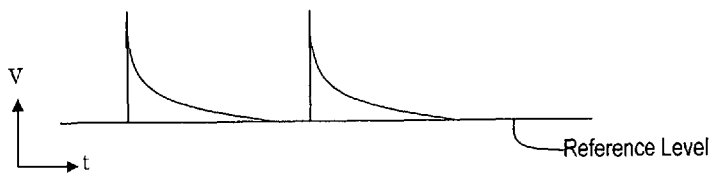
FIG. 10A A diagram showing exemplary changes over time in a signal which is received by a noise eliminating DC circuit of a conventional detection circuit from a demodulation filtering circuit.
Figure 10B:
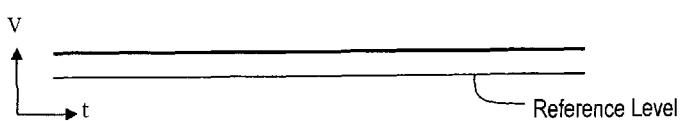
FIG. 10B A diagram showing exemplary changes over time in a DC voltage which is supplied to a conventional A/D converter.

As shown in FIG. 9, in the noise eliminating DC conversion circuit described in Patent Document 3, a capacitor is provided in an amplification circuit in order to smooth an input signal. By the noise eliminating DC conversion circuit, a signal having an induced noise component as shown in FIG. 10A is converted into a DC signal in which an induced noise component and the current value which really needs to be detected (i.e., other than the induced noise component) are time-averaged, as shown in FIG. 10B. FIG. 10A is a diagram showing exemplary changes over time in a signal (voltage value) which is received by the noise eliminating DC circuit from the demodulation filtering circuit, where the vertical axis represents potential and the horizontal axis represents time.

In the method described in Patent Document 3, the transient fluctuations of the signal due to the induced noise component are suppressed to a certain extent but are not completely eliminated, and the voltage level of the averaged DC signal may fluctuate.

On the other hand, with the method of the present embodiment employing a strobe signal, the fluctuations in level due to an induced noise component associated with polarity inversions can be substantially completely eliminated, thus providing an improved accuracy of position detection over the method described in Patent Document 3. In other words, transient fluctuations in the signal due to the induced voltage spans a wide range of frequency spectrum, which cannot be sufficiently eliminated by the band-pass filter of Patent Document 3. On the other hand, according to the embodiment of the present invention, the transient fluctuations can be sufficiently eliminated with a strobe signal. Furthermore, in the embodiment of the present invention, a strobe signal can be obtained with a simple circuit structure, by utilizing signals which are used for driving a liquid crystal display panel.

Another reason for the low accuracy of position detection by conventional touch sensors is that currents steadily flow through the stray capacitances that exist when no contact point is formed on the conductive film for position detection (i.e., when the touch sensor is not touched with a finger or pen), whereby output voltage value of the position detection circuit (hereinafter referred to as "output bias value") takes a non-zero value. When a contact point is formed, currents flowing through the finger or the like are added, and therefore only such increments must be extracted for serving as base values for coordinate calculations. However, if the output bias is large and the increment due to the formation of a contact point is small, the SN ratio of the signal component to be extracted will decrease under the influence of irregular fluctuations or variations in the output bias due to external factors, thus resulting in poor coordinate data accuracy. Moreover, an A/D conversion is performed for generating coordinate data. When the output bias value is large, the effective dynamic range of the A/D conversion will become narrow, and the effective number of bits will decrease, thus resulting in the problem of a decreased accuracy of coordinate data (so-called cancellation of significant digits).

A touch-sensored display device according to another embodiment of the present invention further includes, in the current detection circuit of each channel, a compensation element corresponding to a terminal of the transparent conductive film for position detection, in order to suppress the aforementioned decrease in detection accuracy due to the stray capacitance.

Figure 8:
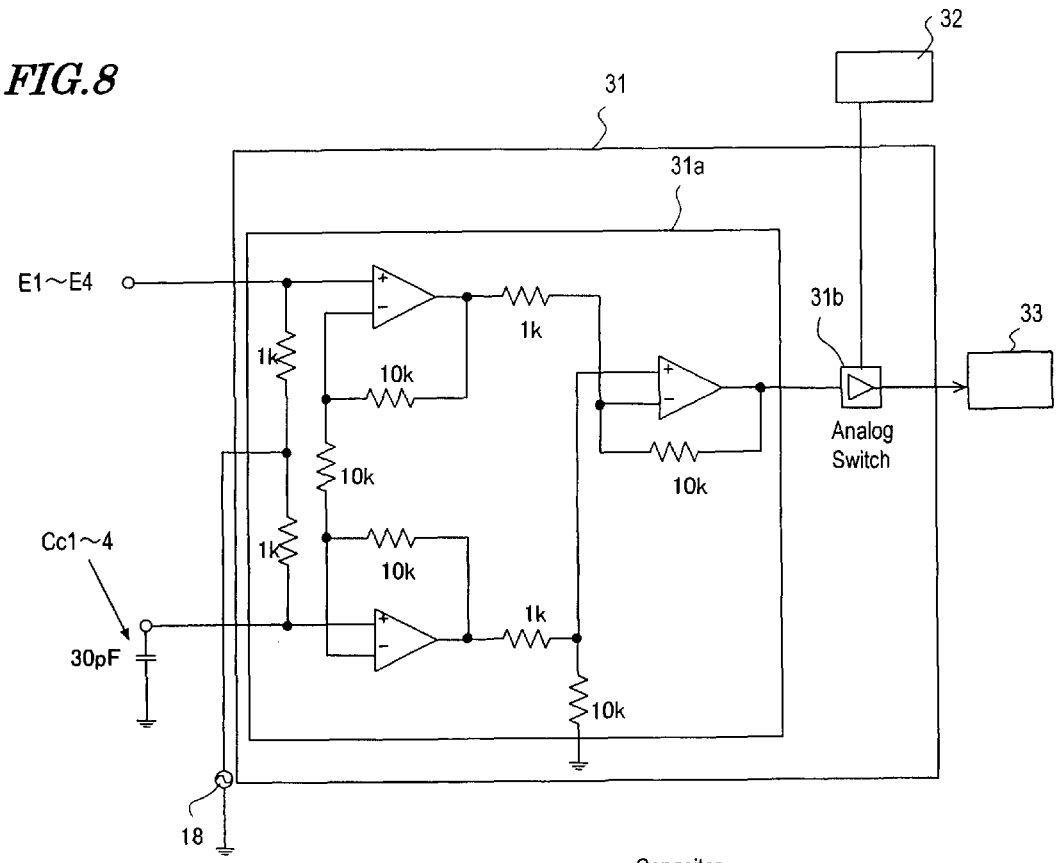
FIG. 8 A diagram showing a position data generation circuit in which a compensation element according to an embodiment of the present invention is provided.

FIG. 8 illustrates a construction in which compensation elements are provided for the above-described position data generation circuit 50. Note that decrease in detection accuracy due to the stray capacitances could also be prevented by providing compensation elements in the detection circuit described in Patent Document 3, for example. It will be appreciated that, in order to improve the accuracy of position detection, it is preferable to provide compensation elements in the aforementioned position data generation circuit 50, as is illustrated herein.

In the current detection circuit 31 illustrated herein, an analog differential amplifier is composed by three operational amplifiers. The resistance values and the compensation element (capacitor) value shown in FIG. 8 are exemplary values for a 7-inch wide TFT-type liquid crystal display panel. It will be appreciated that these values are to be adjusted in accordance with the screen size of the display panel and the construction and arrangement of the transparent conductive film for position detection. The values of the impedances of the compensation elements Cc1 to Cc4 are set so as to be substantially equal to the stray capacitances (including the capacitance of the wiring portion) as seen from the respectively-corresponding terminals E1 to E4. Although a construction in which capacitances (capacitors) are provided as compensation elements is illustrated herein, this is not a limitation. For example, in the case where the wiring resistance from the transparent conductive film for position detection to the current detection circuit is nonnegligible, a capacitor and a resistor which are in series or parallel connection may be used as a compensation element.

As shown in FIG. 8, each of the compensation elements Cc1 to Cc4 is independently provided for the corresponding current detection circuit 31. Each current detection circuit 31 constitutes a differential amplifier. One of the inputs of the differential amplifier is electrically connected to one of the terminals, whereas the other is electrically connected to the compensation element (capacitance). For example, an electrode of the compensation element (capacitance) Cc1 and the terminal E1 of the transparent conductive film for position detection are connected to +terminals of two operational amplifiers which are provided at the input side of an analog differential amplifier 31a. The analog differential amplifier 31a converts a difference between the current flowing from the terminal E1 and the current flowing from the compensation element (capacitance) Cc1 to a voltage, and amplifies it.

Now, by prescribing the capacitances of the compensation elements (capacitances) Cc1 to Cc4 so as to be equal to the stray capacitances that exist when no contact point is formed on the conductive film for position detection, it becomes possible to amplify only the changes in currents due to changes in capacitances (i.e., impedance change) that are ascribable to the formation of a contact point on the conductive film for position detection. In this case, the impedances of the compensation elements Cc1 to Cc4 are substantially equal to the impedances of the stray capacitances that exist when no contact point is formed on the transparent conductive film for position detection. With such a construction, before detecting changes in the currents flowing from different points on the transparent conductive film for position detection, it is possible to compensate for and cancel the contributions of the stray capacitances that exist when no contact point is formed on the transparent conductive film for position detection.

Although it is desirable to prescribe the impedances of the compensation elements to stray capacitance values that are ascertained through actual measurements for each touch sensor, the impedances of the compensation elements may be set to representative values in view of a range of variations at the time of production. Of course, it is possible to adopt a construction which allows for variable impedance and make adjustments for each touch sensor.

Furthermore, a circuit may be provided which retains in an analog or digital manner a noise-cut current signal that is output from each noise-cut current signal generation circuit 30 while no contact point is formed, and based on the noise-cut current signals which are retained in an analog or digital manner, the contributions of the stray capacitances that exist when no contact point is formed on the transparent conductive film 7 for position detection may be compensated for and cancelled. In order to compensate for the noise-cut current signal that exists when no contact point is formed in an analog manner, another sample/hold circuit 35 as shown in FIG. 4 may be provided for each channel, for example, and the noise-cut current signal that exists when no contact point is formed may be previously retained as an analog voltage. By subtracting the retained analog voltage from an analog voltage corresponding to the noise-cut current signal that exists when a contact point is formed on the transparent conductive film 7 for position detection, the contribution of the stray capacitance can be compensated for and cancelled. In order to digitally compensate for a noise-cut current signal that exists when no contact point is formed, the noise-cut current signal that exists when no contact point is formed may be converted into digital data by an AD converter, and retained in the additional sample/hold circuit 35. By similarly using an AD converter to convert into digital data the noise-cut current signal that exists when a contact point is formed on the transparent conductive film 7 for position detection, and subtracting the aforementioned retained digital data therefrom, the contribution of the stray capacitance can be compensated for and cancelled. In practice, general-purpose capacitors are produced with coarsely different capacitance values, making it difficult to prepare a compensation element that has a particular impedance. Thus, a portion of the stray capacitance may be cancelled with a compensation element and the remainder that cannot be cancelled with the compensation element may be cancelled through the aforementioned processing. It will be appreciated that this is also applicable to the case where no compensation elements are provided.

The effect of obtaining an improved detection sensitivity by providing compensation elements is not limited to the present embodiment. For example, with reference to FIG. 4, compensation elements may be provided for a position data generation circuit 50 from which the strobe signal generation circuit 32 and the noise elimination circuits 33 are omitted, whereby the effect of improving the detection sensitivity can also be obtained.

The above description illustrates examples where an active matrix-type liquid crystal panel is employed as the display panel 10, but the display panel 10 to be used for the present embodiment is not limited thereto. For example, an electrophoresis display panel having an electrophoresis layer as the display medium layer, or the like can also be used. Moreover, the noise-cutting technique of the present invention that utilizes a strobe signal is applicable to any arbitrary display panel so long as a common voltage which undergoes periodic inversion in polarity is applied to a transparent counter electrode comprised in the display panel.

INDUSTRIAL APPLICABILITY

According to the present invention, without requiring a complicated circuit structure, a thin touch-sensored display device which has a high accuracy of position detection and a small parallax can be provided. The touch-sensored display device of the present invention can be suitably used for a car navigation apparatus, a portable information terminal (PDA), an ATM, a ticket vending machine, or the like, for example.

The invention claimed is:

1. A touch-sensored display device comprising:
   a display panel including: an active matrix substrate having a plurality of pixel electrodes, a display medium layer, and a counter substrate disposed on a viewer side of the active matrix substrate via the display medium layer, the counter substrate having a counter electrode which opposes the plurality of pixel electrodes;
   a display panel driving circuit for supplying display signal voltages to the plurality of pixel electrodes, and supplying to the counter electrode a common voltage which undergoes periodic inversion in polarity;
   a transparent conductive film for position detection, placed so as to oppose the counter electrode via the counter substrate;
   a plurality of terminals connected to different points on the transparent conductive film for position detection;
   an AC voltage generation circuit for supplying an AC voltage for position detection to the plurality of terminals; and
   a position data generation circuit including: a strobe signal generation circuit for generating a strobe signal which is in synchronization with a polarity inversion period of the common voltage, and a plurality of noise-cut current signal generation circuits each being connected to one of the plurality of terminals and generating a noise-cut current signal which is obtained by eliminating a noise ascribable to an induced voltage that occurs on the transparent conductive film responsive to the common voltage from a current flowing from one of the plurality of terminals by using the strobe signal, wherein the induced voltage is induced on the transparent conductive film for position detection, the position data generation circuit generating position data of a contact point which is formed directly or indirectly on the transparent conductive film for position detection, the position data being generated based on the noise-cut current signal.

2. The touch-sensored display device of claim 1, wherein each of the plurality of noise-cut current signal generation circuits includes: a current detection circuit for detecting a current flowing from one of the plurality of terminals and outputting a current signal; and a noise elimination circuit for eliminating a predetermined portion from the current signal based on the strobe signal.

3. The touch-sensored display device of claim 2, wherein, from the current signal which is output from the current detection circuit, the noise elimination circuit eliminates a portion containing a noise which occurs due to a polarity inversion of the common voltage.

4. The touch-sensored display device of claim 1, wherein, a horizontal synchronizing signal is supplied to the display panel driving circuit; and
   the strobe signal generation circuit generates the strobe signal based on the horizontal synchronizing signal.

5. The touch-sensored display device of claim 4, wherein the strobe signal generation circuit generates a strobe signal containing a pulse which becomes active after the lapse of a predetermined time (Ts1) from a rise or fall of a pulse contained in the horizontal synchronizing signal, and which becomes inactive after the lapse of a predetermined time (Ts2) from a polarity inversion of the common voltage.

6. The touch-sensored display device of claim 4, wherein,
   the display panel driving circuit supplies to the display panel a common voltage which undergoes a polarity inversion after the lapse of a predetermined time (Tc) from a rise or fall of the horizontal synchronizing signal; and
   the strobe signal generation circuit generates a strobe signal containing a pulse which becomes active after the lapse of a predetermined time (Ts1) from the rise or fall of the horizontal synchronizing signal and which becomes inactive after the lapse of a predetermined time (Ts2) from the rise or fall of the horizontal synchronizing signal, where a relationship Ts1<Tc<Ts2 is satisfied.

7. The touch-sensored display device of claim 4, wherein a pulse width of the strobe signal is an integer multiple of one period of the AC voltage for position detection.

8. The touch-sensored display device of claim 4, wherein the AC voltage for position detection has a frequency which is an integer multiple of that of the horizontal synchronizing signal.

9. The touch-sensored display device of claim 4, wherein the AC voltage for position detection has a frequency which is an integer multiple of that of the strobe signal.

10. The touch-sensored display device of claim 4, further comprising an inverter, wherein,
    a driving frequency of the inverter is a frequency which is an integer multiple or half integer multiple of that of the horizontal synchronizing signal.

11. The touch-sensored display device of claim 10, wherein the inverter is a separately-excited inverter, the driving frequency of the inverter being equal to a frequency of the AC voltage for position detection.

12. The touch-sensored display device of claim 10, wherein the driving frequency of the inverter is a frequency which is an integer multiple or half integer multiple of that of the strobe signal.

13. The touch-sensored display device of claim 1, further comprising an A/D converter which is provided commonly for the plurality of noise-cut current signal generation circuits, wherein the position data generation circuit generates the position data based on an output signal from the A/D converter.

14. The touch-sensored display device of claim 1, further comprising a plurality of sample/hold circuits for simultaneously sampling/holding output signals from the plurality of noise-cut current signal generation circuits.

15. The touch-sensored display device of claim 1, wherein,
    each of the plurality of noise-cut current signal generation circuits has a current detection circuit for detecting a current flowing from one of the plurality of terminals and outputting a current signal, and a noise elimination circuit for eliminating a predetermined portion from the current signal based on the strobe signal; and
    an independent compensation element is connected to each of the plurality of current detection circuits.

16. The touch-sensored display device of claim 15, wherein each of the plurality of current detection circuits has a differential amplifier, one input of the differential amplifier being electrically connected to one of the plurality of terminals, and the other input being electrically connected to the compensation element.

17. The touch-sensored display device of claim 15, wherein impedances of the plurality of compensation elements are substantially equal to impedances of stray capacitances that exist when no contact point is formed on the transparent conductive film for position detection.

18. The touch-sensored display device of claim 1, further comprising a circuit for retaining in an analog or digital manner the noise-cut current signal which is output from each of the plurality of noise-cut current signal generation circuits while no contact point is formed.

19. The touch-sensored display device of claim 1, wherein,
a horizontal synchronizing signal is supplied to the display panel driving circuit; and
the AC voltage for position detection has a frequency which is n times (where n is an integer) or 1/n times as large as that of the horizontal synchronizing signal, and is in synchronization with the horizontal synchronizing signal.

20. The touch-sensored display device of claim 1, wherein,
a horizontal synchronizing signal is supplied to the display panel driving circuit; and
a frequency of the AC voltage for position detection is a frequency between a first frequency which is n times (where n is an integer) or 1/n times as large as that of the horizontal synchronizing signal and a second frequency which is n+1 times or 1/(n+1) times as large as that of the horizontal synchronizing signal.

21. The touch-sensored display device of claim 20, wherein the frequency of the AC voltage for position detection is set so as to be a frequency between the first frequency and the second frequency even when the frequency of the AC voltage for position detection is deviated due to an error in a constant of the AC voltage generation circuit.

22. The touch-sensored display device of claim 20, wherein the frequency of the AC voltage for position detection is distant by 1 kHz or more from both the first frequency and the second frequency.

23. The touch-sensored display device of claim 20, wherein a frequency which is m times (where m is an integer) or 1/m times as large as that of the AC voltage for position detection is substantially equal to a frequency which is M times (where M is an integer) or 1/M times as large as that of the horizontal synchronizing signal.

24. A driving method for driving a touch-sensored display device which includes: a display panel including an active matrix substrate having a plurality of pixel electrodes, a display medium layer, and a counter substrate disposed on a viewer side of the active matrix substrate via the display medium layer, the counter substrate having a counter electrode which opposes the plurality of pixel electrodes; a display panel driving circuit for supplying display signal voltages to the plurality of pixel electrodes, and supplying to the counter electrode a common voltage which undergoes periodic inversion in polarity; a transparent conductive film for position detection, placed so as to oppose the counter electrode via the counter substrate; a plurality of terminals connected to different points on the transparent conductive film for position detection; an AC voltage generation circuit for supplying an AC voltage for position detection to each of the plurality of terminals; and a plurality of noise-cut current signal generation circuits each being connected to one of the plurality of terminals,
wherein the driving method comprises:
a step of supplying a horizontal synchronizing signal to the display panel driving circuit;
a step of supplying to the display panel the common voltage, the polarity of the common voltage being inverted at a point in time after the lapse of a predetermined period from a pulse of the horizontal synchronizing signal;
a step of generating a strobe signal having a pulse which rises or falls before the predetermined period elapses since a pulse of the horizontal synchronizing signal and which falls or rises after the predetermined period has elapsed;
a step of generating a plurality of noise-cut current signals obtained by eliminating a noise ascribable to an induced voltage that occurs on the transparent conductive film responsive to the common voltage from a current flowing from each of the plurality of terminals by using the strobe signal, wherein the induced voltage is induced on the transparent conductive film for position detection; and
a step of, based on the plurality of noise-cut current signals, generating position data of a contact point which is formed directly or indirectly on the transparent conductive film for position detection.

25. The driving method of claim 24, wherein,
the step of generating the plurality of noise-cut current signals comprises:
a step of generating a plurality of current signals by detecting a current flowing from each of the plurality of terminals; and
a step of eliminating a portion corresponding to the pulse of the strobe signal from each of the plurality of current signals.

26. The driving method of claim 24, further comprising a step of retaining in an analog or digital manner the plurality of noise-cut current signals generated while no contact point is formed on the transparent conductive film for position detection.

27. The driving method of claim 26, further comprising a step of, based on the plurality of noise-cut current signals retained in an analog or digital manner, compensating for stray capacitances that exist when no contact point is formed on the transparent conductive film for position detection.

28. The driving method of claim 24, further comprising a step of amplifying an amount of change in current due to a contact point being formed on the transparent conductive film for position detection.

* * * * *